(12) United States Patent
Sano

(10) Patent No.: US 7,535,659 B2
(45) Date of Patent: May 19, 2009

(54) IMAGE PICKUP LENS, IMAGE PICKUP APPARATUS AND MOBILE TERMINAL

(75) Inventor: Eigo Sano, Hino (JP)

(73) Assignee: Konica Minolta Opto, Inc., Hachioji-Shi, Tokyo (JP)

( * ) Notice: Subject to any disclaimer, the term of this patent is extended or adjusted under 35 U.S.C. 154(b) by 63 days.

(21) Appl. No.: 11/893,180

(22) Filed: Aug. 15, 2007

(65) Prior Publication Data

US 2008/0043346 A1 Feb. 21, 2008

(30) Foreign Application Priority Data

Aug. 21, 2006 (JP) ............... 2006-223957

(51) Int. Cl.
  *G02B 9/34* (2006.01)
  *G02B 3/02* (2006.01)
  *G02B 9/00* (2006.01)
(52) U.S. Cl. .................. 359/773; 359/715; 359/739
(58) Field of Classification Search ............ 359/708, 359/715, 738, 739, 771, 772, 773
  See application file for complete search history.

(56) References Cited

U.S. PATENT DOCUMENTS 7,433,135 B2 * 10/2008 Sun ................ 359/773
7,446,954 B2 * 11/2008 Sun ................ 359/773

FOREIGN PATENT DOCUMENTS

| JP | 2002-365529 | 12/2002 |
| JP | 2002-365530 | 12/2002 |
| JP | 2002-365531 | 12/2002 |
| JP | 2004-341013 | 12/2004 |
| JP | 2005-292559 | 10/2005 |

\* cited by examiner

*Primary Examiner*—William C Choi
*Assistant Examiner*—Jack Dinh
(74) *Attorney, Agent, or Firm*—Cohen Pontani Lieberman & Pavane LLP

(57) ABSTRACT

The present invention provides an image pickup lens for forming a light flux from a subject into an image on a photoelectric converter of a solid image pickup element, and the image pickup lens includes, in order from an object side thereof: and aperture stop; a first lens having a positive refractive power; a second lens having a negative refractive power; a third lens having a positive refractive power; and a fourth lens having a negative refractive power. The fourth lens includes a concave surface facing the object side and at least one optical surface has an aspheric shape in the fourth lens. The image pickup lens satisfies the predetermined condition according to a curvature radius of the surfaces of the fourth lens and a focal length.

10 Claims, 13 Drawing Sheets

IMAGE PICKUP LENS, IMAGE PICKUP APPARATUS AND MOBILE TERMINAL

This application is based on Japanese Patent Application No. 2006-223957 filed on Aug. 21, 2006, in Japanese Patent Office, the entire content of which is hereby incorporated by reference.

TECHNICAL FIELD

The present invention relates to a small-sized image pickup lens, an image pickup apparatus and a mobile terminal equipped with the image pickup apparatus, in which a solid image pickup element such as a CD-type image sensor or a CMOS-type image sensor is employed.

BACKGROUND

In recent years, a cell-phone and a mobile information terminal both carrying an image pickup apparatus are growing popular, with a trend to attain a highly efficient and small-sized image pickup apparatus employing a solid image pickup element such as a CCD (Charge Coupled Device) type image sensor or a CMOS (Complementary Metal Oxide Semiconductor) type image sensor. Further, demands for the image pickup lens mounted on the image pickup apparatus to be smaller in size and to be higher in efficiency are becoming stronger. As an image pickup lens used for the aforesaid uses, there is suggested a four-element image pickup lens because of the reason that acquisition of higher efficiency is more probable for the four-element image pickup lens than for a two-element or three-element image pickup lens.

As this four-element image pickup lens, there is disclosed the so-called inverted Ernostar type image pickup lens which includes the first lens having positive refractive power, the second lens having negative refractive power, the third lens having positive refractive power and the fourth lens having positive refractive power in this order from the photographic object side, to aim high efficiency (for example, see Unexamined Japanese Patent Application Publication No. 2004-341013).

Further, there is disclosed the so-called a telephoto type image pickup lens which includes the first lens having positive refractive power, the second lens having negative refractive power, the third lens having positive refractive power and the fourth lens having negative refractive power in this order from the photographic object side, to aim downsizing of a total length of the image pickup lens, where the total length means a distance on the optical axis from the lens surface closest to the object in the total system of the image pickup lens to the focal point on the image side (For example, see Unexamined Japanese Patent Application Publication Nos. 2002-365529, 2002-365530, 2002-365531, and 2005-292559).

However, since the image pickup lens described in the Unexamined Japanese Patent Application Publication (JP-A) No. 2004-341013 has a positive fourth lens due to the inverted Ernostar type, the image pickup lens provides a principal point position of the optical system closer to the image side and provides a longer back focus, compared with an image pickup lens of telephoto type which provides a negative fourth lens. Therefore, such type of image pickup lens as described in JP-A 2004-341013 is disadvantageous for downsizing. In addition, there is provided only one lens having negative refractive power among four lenses in the image pickup lens. Thus, it provides a difficulty in correction of Petzval's sum, and in securing excellent performance on the periphery portion of the image area.

The image pickup lens described in each of JP-A 2002-365529, 2002-365530, and 2002-365531 has a narrower imaging field angle and its aberrations is insufficiently corrected. If the total length of the image pickup lens is further shortened, it becomes difficult to be used with an image pickup element with a large number of pixels due to deterioration of its performance.

In addition, the image pickup lens described in JP-A No. 2005-292559 has a long back focus in spite of its telephoto type, because the negative refractive power of the fourth lens is relatively weak, and cannot attain sufficient downsizing. Further, aberration correction is also insufficient in the view of coping with an image pickup element with a large amount of pixels.

SUMMARY

The invention has been achieved in view of the aforesaid problems, and one of its objects is to provide a four-element image pickup lens, an image pickup apparatus and a mobile terminal equipped with the image pickup apparatus, in which a size thereof is smaller than a conventional type and various types of aberrations are corrected favorably.

An image lens relating to the present invention is provided for forming a subject image on a photo-electric converter of a solid image pickup element. The image pickup lens includes, in order from an object side thereof: an aperture stop; a first lens having a positive refractive power; a second lens having a negative refractive power; a third lens having a positive refractive power; and a fourth lens having a negative refractive power whose surface facing the object side is a concave surface. The fourth lens includes at least one optical surface in an aspheric shape. Further, the image pickup lens satisfies the predetermined condition about focal lengths and curvature radiuses of the fourth lens.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
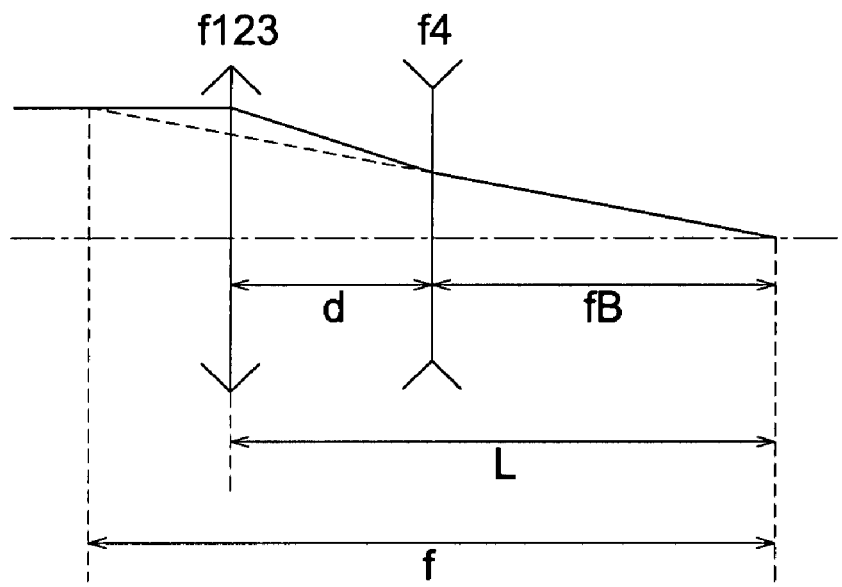
FIG. 1 shows an illustration about relationship between the total length of an image pickup lens and a focal length of the first lens.

Preferred embodiments of the present invention will be described below.

An image pickup lens according to the present invention is provided for forming a subject image on a photo-electric converter of a solid image pickup element. The image pickup lens includes, in order from an object side thereof: an aperture stop; a first lens having a positive refractive power; a second lens having a negative refractive power; a third lens having a positive refractive power; and a fourth lens having a negative refractive power whose surface facing the object side is a concave surface. The fourth lens includes at least one optical surface in an aspheric shape. The image pickup lens satisfies the expressions (1) and (2).

$$0.40 < f1/f < 1.30 \qquad (1)$$

$$-3.0 < (r7+r8)/(r7-r8) < 0 \qquad (2)$$

Where, f1 is a focal length of the first lens, f is a focal length of a total system of the image pickup lens, r7 is a curvature radius of the surface facing the object side on the fourth lens, and r8 is a curvature radius of the surface facing an image side on the fourth lens.

The basic structure for acquiring an image pickup lens which is small in size and is corrected favorably in terms of aberration, includes therein an aperture stop, the first lens having a positive refractive power, the second lens having a negative refractive power, the third lens having a positive refractive power and the fourth lens having a negative refractive power and having a concaved surface facing the object side, in this order from the object side. This lens structure is the so-called telephoto type lens structure in which a positive lens group including the first to third lenses and a negative fourth lens including a concave surface facing the object side are arranged from the object side, which is a structure advantageous for downsizing of the total length of the image pickup lens.

Further, by making each of two lenses out of the four-element image pickup lens to be a negative lens, the numbers of surfaces having light-diverging effects are increased and the Petzval's sum is corrected easily. Therefore, it is possible to obtain an image pickup lens which secures excellent image forming efficiency on the surface up to the peripheral part of the image area. Further, by providing at the fourth lens arranged to be closest to the image side in which least one surface is formed to be an aspheric surface, various aberrations on the peripheral part of the image area can be corrected favorably.

In addition, by arranging an aperture stop to be the most object side, it is possible to arrange an exit pupil position to be farther from an image pickup plane, and thereby to control an incident angle of the principal ray (an angle between a principal ray and an optical axis) of a light flux that forms an image on a peripheral part of the image pickup plane of the solid image pickup element to be small, thus, it is possible to secure the so-called telecentricity. Further, even when a mechanical shutter is required, the shutter can be arranged to a position closest to the object, and an image pickup lens whose total length is short can be obtained.

Herein, with respect to a measure of a small-sized image pickup lens, embodiments of the invention are provided with aimed at downsizing at the level to satisfy the following expression (6). By satisfying the following range, the total length of the image pickup lens can be shortened, and an outside diameter of the lens can also be made smaller synergistically. Owing to this, it is possible to attain downsizing and weight reduction of the total image pickup apparatus.

$$L/f<1.40 \qquad (6)$$

In the expression, L represents a distance from a lens surface closest to the object side in the total system of image pickup lens to the focus on the image side, and f represents a focal length of the total system of an image pickup lens.

Herein, the focus on the image side means an image point resulting in the case where parallel light that is in parallel with an optical axis enters the image pickup lens. Meanwhile, when a parallel flat plate such as an optical lowpass filter, an infrared blocking filter or a seal glass of an image pickup element is arranged between the surface closest to the image side in the image pickup lens and the focus position on the image side, a value of the aforesaid L is to be calculated under the condition that a parallel flat plate portion is made to be an air-conversion distance.

Further, the structure more preferably satisfies the following conditional expression.

$$L/f<1.30 \qquad (6)'$$

Conditional expression (1) is provided to set a focal length of the aforesaid first lens properly and thereby to attain shortening of the total length of the image pickup lens and to attain aberration correction properly.

A relationship between the total length of the image pickup lens and the focal length of the first lens will be explained below. As shown in FIG. 1, the lens structure of a preferred embodiment of the invention is assumed to be a lens system including the first to third lenses which are composed to be a single thin and positive lens (their focal length is represented by f123), and the fourth lens is made to be a single thin and negative lens (its focal length is represented by f4), in which the composite lens and the fourth lens are arranged to be away from each other by distance d. In this lens structure, the lens total length L is given by the following expressions (9).

$$L = fB + d \qquad (9)$$
$$= f(1 - d/f123) + d$$
$$= f - ((f/f123) - 1)d$$

From the expression (9), it is understood that when each of the focal length f of the total optical system and the composite focal length f123 of the first to third lens are constant and distance d between the composite lens and the fourth lens grows greater, the total length of the image pickup lens becomes shorter. In other words, by arranging the composite principal point for the first to third lenses to be closer to the object side, namely, by setting the refractive power of the first lens to be relatively strong, the total length of the image pickup lens can be made shorter.

Therefore, when a value of the conditional expression (1) is less than the upper limit, the refractive power of the first lens can be maintained properly, the composite principal point for the first to third lenses can be arranged to be closer to the object, and the total length of the image pickup lens can be shortened. On the other hand, when the aforesaid value is higher than the lower limit, the refractive power of the first lens does not grow more than necessary, and the higher order of spherical aberration and comatic aberration can be controlled to be small. Incidentally, a range of the following expression (1') is more preferable.

$$0.50 < f1/f < 1.20 \quad (1')$$

Conditional expression (2) represents conditions for setting a form of the fourth lens properly. In the range shown by conditional expression (2), the fourth lens changes in terms of a form from a meniscus form with a negative refractive power whose convex surface faces the object side to a biconcave form wherein refractive power on the surface facing the object side is greater than that on the surface facing the image side. As stated above, fB also needs to be shortened for shortening the total length. Therefore, by making a value of the conditional expression (2) not exceed the upper limit, it is possible to secure properly the distance between the image pickup surface and the vertex of the surface of the fourth lens facing the image side, while shortening fB. On the other hand, by making a value of the conditional expression (2) exceed the lower limit, the principal point of the fourth lens does not approach the image side excessively, and a height of a ray of light on the optical axis passing through the fourth lens can be maintained properly, which is advantageous for correction of axial chromatic aberration. Incidentally, a range of the following expression (2') is more preferable.

$$-2.5 < (r7+r8)/(r7-r8) < -0.1 \quad (2')$$

A range of the following expression (2") is further more preferable.

$$-2.5 < (r7+r8)/(r7-r8) < -0.3 \quad (2'')$$

The image pickup lens according to the present invention may satisfy the following expression (3).

$$0.05 < d34/f < 0.25 \quad (3)$$

Where, d34 is a distance along an optical axis of an air space between the third lens and the fourth lens, and f is a focal length of a total system of the image pickup lens.

Conditional expression (3) represents conditions for setting a distance between the third lens and the fourth lens properly. As stated above, when distance d from the composite lens including the first through third lenses to the fourth lens grows greater, the total length of the image pickup lens becomes shorter. Therefore, when a value of the conditional expression (3) is higher than its lower limit, the distance between the third lens and the fourth lens does not become too small, resulting in an advantageous point for reduction of the total length of the lens. In addition, since the surface facing the image side of the third lens and the surface facing the object side of the fourth lens do not approach each other to be too close, it is easy to secure a space for a light shielding member to block unwanted light such as ghost to be inserted between the third lens and the fourth lens. Further, when trying to adjust the focal position with autofocusing or a macro switching function, the focal position is generally adjusted by the total feeding operation which is conducted by moving the total system of lens group in the optical axis direction. However, in the image pickup lens relating to the invention, the space between the third lens and the fourth lens is secured properly and it allows the image pickup lens to employ subgroup feeding operation which is conducted by moving a part of the lens group, for example, a group of the first lens through the third lens in the optical axis direction to adjusting the focal position. If the subgroup feeding operation is employed, the moving lens group may be a part of the lens group rather than the total lens group, therefore, it is possible to simplify the driving mechanism, and downsizing and weight reduction of the total image pickup apparatus can be attained.

On the other hand, when a value of the conditional expression (3) is lower than its upper limit, a distance between the third lens and the fourth lens does not grow excessively, and a height of a ray of light on the optical axis passing through the fourth lens can be maintained properly, which is advantageous for correction of axial chromatic aberration. Incidentally, a range of the following expression is more preferable.

$$0.05 < d34/f < 0.22 \quad (3')$$

The image pickup lens according to the present invention may satisfy the following expression (4).

$$0.30 < r4/f < 0.80 \quad (4)$$

Where, r4 is a curvature radius of the surface facing the image side on the second lens, and f is a focal length of the image pickup lens.

Conditional expression (4) represents conditions for setting a curvature radius of the surface on the second lens facing the image side properly. By making the surface of the second lens facing the image side to be a strong divergent surface satisfying the conditional expression (4), axial chromatic aberration generated in the first lens having positive refractive power can be corrected properly with the second lens. Further, when a value of the conditional expression (4) exceeds the lower limit, the curvature radius does not become too small and processability is not worsened. On the other hand, when a value of the conditional expression (3) does not exceed the upper limit, chromatic aberration can be corrected favorably while the Petzval's sum is kept to be small. Further the following expression (4') is more preferable.

$$0.35 < r4/f < 0.70 \quad (4')$$

In the image pickup lens according to the present invention, a surface facing the image side on the second lens may be an aspherical surface such that a farther position on the aspherical surface from an optical axis has a smaller negative refractive power.

When the surface of the second lens facing the image side is made to be in a form of an aspheric surface wherein negative refractive power becomes weaker toward the periphery from the center, a ray of light is not lifted excessively on the peripheral portion of the lens, and excellent telecentricity on the peripheral portion can be secured.

In the image pickup lens according to the present invention, the surface facing the object side on the fourth lens may be an aspherical surface such that a farther position on the aspherical surface from an optical axis has a smaller negative refractive power.

By making the surface of the fourth lens facing the object side is made to be in a form of an aspheric surface wherein negative refracting power becomes weaker toward the periphery from the center, and excellent telecentricity on the peripheral portion can be secured. Further, it becomes unnecessary to weaken negative refractive power excessively on the lens peripheral portion on the surface of the second lens closer to the image side, and it becomes possible to correct off-axis aberrations favorably.

An image pickup lens according to the present invention may satisfy the following conditional expression (5).

$$20 < v1 - v2 < 65 \quad (5)$$

Where v1 is an Abbe number of the first lens, and v2 is an Abbe number of the second lens.

Conditional expression (5) represents conditions for correcting chromatic aberration of the total image pickup lens system in good condition. When a value of the conditional expression (5) exceeds the lower limit, axial chromatic aberration and magnification chromatic aberration can be corrected in a balanced manner. On the other hand, when a value of the conditional expression (5) does not exceed the upper limit, lens material obtainable easily can be used for making the lens. Incidentally, a range of the following expression (5') is more preferable.

$$25 < v1 - v2 < 65 \quad (5')$$

In the image pickup lens according to the present invention, one of the first lens and the third lens comprise a glass and the other comprises a plastic.

By forming one of the first lens and the third lens both having positive refractive power by the use of glass material which hardly have a refractive index change caused by temperature changes, and by forming the other lens by the use of plastic material, it is possible to compensate fluctuation of image point position in the total image pickup lens system, while using many plastic lenses. More specifically, by making the positive first lens or the positive third lens formed by plastic material to have relatively large positive refractive power, and by making two negative lenses including the second lens and the fourth lens to share the negative refractive power, allocation of refractive power for plastic lenses can be optimized, and contribution to image point fluctuation caused by temperature changes works in the direction to cancel the fluctuation, whereby, the fluctuation caused by temperature changes in the total image pickup system can be controlled to be small.

If the first lens is made of glass material, it is possible to construct so that plastic lenses may not be exposed to the outside, thus, the problem of scratches on the first lens can be avoided, resulting in more preferable structures.

Incidentally, in this specification, "formed of plastic material" and "comprises a plastic" include an occasion wherein a plastic material is used as base material, and its surface is subjected to coating processing for the purpose of antireflection and improvement of hardness on the surface. They further include also a material that inorganic microparticles are mixed in a plastic material for the purpose of controlling changes in refractive index of plastic material caused by temperature changes to be small.

In the image pickup lens according to the present invention, each of the first through fourth lenses may comprise a plastic.

In recent years, for the purpose of downsizing of the total solid image pickup apparatus, there have been developed a solid image pickup element having a smaller pixel pitch comparing with general image pickup element having the same number of pixels, which results in the image pickup element with a smaller size of an image pickup area. The image pickup lens of this type to be used for the solid image pickup element having a small size of an image pickup area, is required to have relatively a short focal length of the total system. Therefore, a curvature radius and an outside diameter of each lens are tolerably small. Compared with a glass lens manufactured by time-consuming grinding processing, therefore, it is possible to manufacture inexpensively on a mass production basis even in the case of a lens having a small curvature radius and a small outside diameter, if all lenses are composed of plastic lenses manufactured through injection molding. Further, in the case of a plastic lens, a temperature for pressing can be low, and wear damage of an injection mold can be controlled accordingly, resulting in reduction of the number of replacements of the injection mold and reduction of the number of maintenances, which attains cost reduction.

An image pickup apparatus according to the present invention includes a solid image pickup element; a substrate supporting the solid image pickup element; a connecting terminal formed on the substrate for transmitting and receiving electrical signal. The image pickup apparatus further includes a casing comprising a shielding material, and comprising an aperture where a light flux from an object side enters into. The image pickup apparatus further includes the above described image pickup lens housed in the casing, for receiving a light flux passing through the aperture and forming the light flux onto the solid image pickup element. In the image pickup apparatus, the casing, the image pickup lens, and the substrate are integrally formed as one body. The image pickup apparatus has a height of 10 mm or less along the optical axis.

It is possible to obtain an image pickup apparatus that is smaller in size and higher in performance, by using the image pickup lens relating to the invention. In this specification, "an aperture where a light flux from an object side enters into" means a partial space in which there is formed an area through which an incident light coming from an object side can be transmitted, without being limited to a partial space in which there is formed an air space such as a hole.

Further, "the image pickup apparatus has a height of 10 mm or less along the optical axis" means the total length running parallel with the direction of an optical axis of the image pickup apparatus equipped with the aforesaid all elements. Therefore, in the case where a casing is provided on the top side of the substrate and electronic parts are mounted on the back side of the substrate, for example, it is assumed that a distance from the end portion of the casing facing the object side to the end portion of an electronic part protruded from the back side is not more than 10 mm.

A mobile terminal according to the present invention comprises the above described image pickup apparatus.

It is possible to obtain a mobile terminal that is smaller in size and higher in performance, by using the image pickup apparatus relating to the invention.

Figure 12:
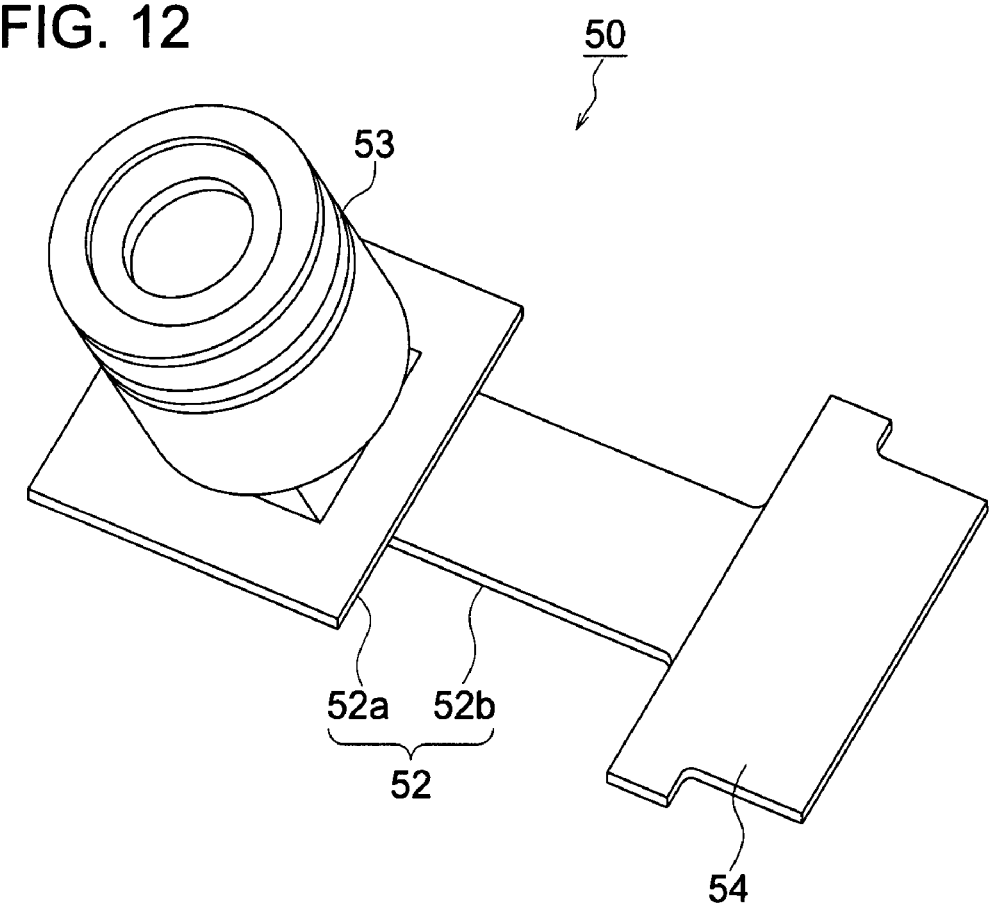
FIG. 12 is a perspective view of an image pickup apparatus relating to the present embodiment.

An embodiment of the invention will be explained as follows, referring to FIG. 12 and FIG. 13. FIG. 12 shows a perspective view of image pickup apparatus 50 of an example of the present embodiment, and FIG. 13 is a cross sectional view taken on an optical axis of the image pickup lens of image pickup apparatus 50.

Figure 13:
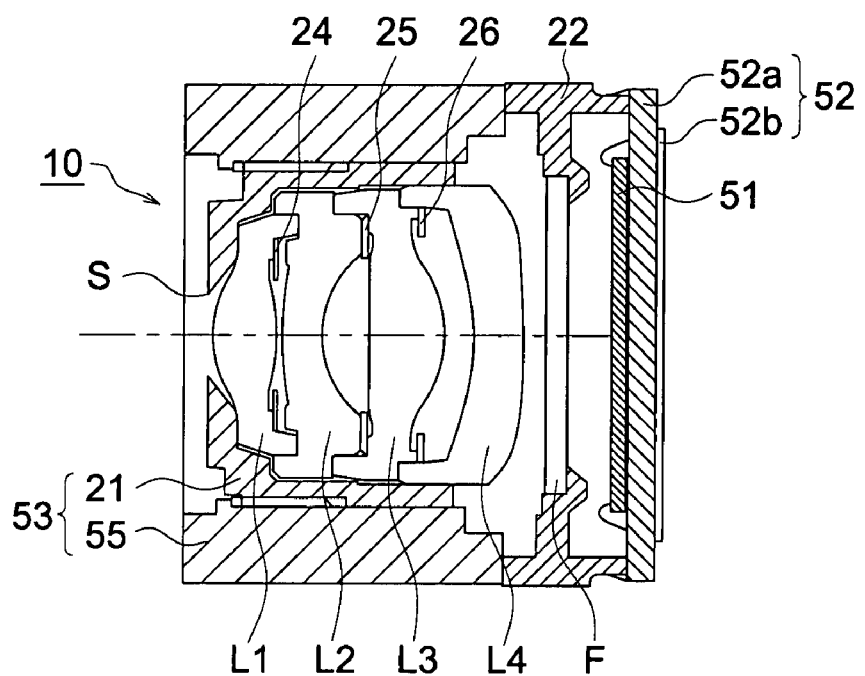
FIG. 13 is a diagram showing schematically a cross section along an optical axis of an image pickup lens of an image pickup apparatus relating to the present embodiment.

As shown in FIG. 13, the image pickup apparatus 50 is provided with: casing 53 serving as a lens-barrel; CCD type image sensor 51 serving as an image pickup element; image pickup lens 10, and substrate 52. Casing 53, image pickup lens 10, and substrate 52 are integrally formed as one body. The casing 53 is formed with a light-shielding material and includes an opening (an aperture) for an incident light flux coming from a photographic object side. The image pickup lens 10 forms an image of the photographic object on the CCD type image sensor 51. The substrate 52 supports the CCD type image sensor 51 and includes external connecting terminal 54 (see FIG. 12) which transmits and receives electrical signal of the image sensor 51. Incidentally, the image pickup element is not limited to the CCD type image sensor, and other ones including CMOS or the like can be used.

The substrate 52 is equipped with supporting flat plate 52a and flexible substrate 52b. The supporting flat plate 52a supports, on its one surface, the image sensor 51 and further supports the casing 53 through holding collar 22 that holds filter F such as an infrared cutoff filter. One end of the flexible substrate 52b is connected to the back surface (surface opposite to image sensor 51) of the supporting flat plate 52a, and the flexible substrate 52b is connected to image sensor 51 through the supporting flat plate 52a. Alternatively, it is also possible to connect the supporting flat plate 52a directly to the external connecting terminal 54, skipping the flexible substrate 52b, and to insert the external connecting terminal into a socket section on the mobile terminal side to connect to a connector portion formed on the socket section.

Next, the casing 53 and the image pickup lens 10 will be explained. The casing 53 is equipped with outer barrel 55 and inner barrel 21. The outer barrel 55 is fixed and held on the supporting flat plate 52a by means of adhesion through the holding collar 22 in a way to surround the image pickup element 51. The inner barrel 21 fixes and holds aperture stop S of image pickup lens 10 described later, first lens L1, second lens L2, third lens L3 and fourth lens L4. Then, the inner barrel 21 is screwed in the inside of the outer barrel 55 and is fixed and held therein after back focus of the image pickup lens 10 is adjusted. Incidentally, the aperture stop S provided in the inner barrel 21 determines F-number of the image pickup lens.

Inside the inner barrel 21, there are housed lenses L1, L2, L3 and L4. On the lenses L1, L2 and L3, there are respectively arranged light-shielding masks 24, 25 and 26. Each of the light-shielding masks 24, 25 and 26 regulates a range of an effective diameter which provides an area from an optical axis to the prescribed range having a function as an image pickup lens. A flange portion for mutually holding a lens is formed on a portion that is outside the effective diameter of each of the lenses L1, L2, L3 and L4. Then, a flange portion of the first lens L1 is fitted into a flange portion of the second lens L2, thereby, the first lens L1 and the second lens L2 are made to agree each other accurately in terms of an optical axis. In the same way, the second lens L2 is fitted into a flange portion of the third lens L3, thereby, the second lens L2 and the third lens L3 are made to agree each other in terms of an optical axis. The third lens L3 is fitted in a flange portion of the fourth lens L4, thereby, the third lens L3 and the fourth lens L4 are made to agree each other in terms of an optical axis. As stated above, the image pickup lens 10 is fixed and held by means of adhesives under the state wherein respective lenses L1, L2, L3 and L4 are made to agree each other in terms of an optical axis, and the first lens L1 is pushed in the optical axis direction against an end portion on photographic object side of inner barrel 21 and fourth lens L4 is fitted into inner barrel 21.

Figure 14:
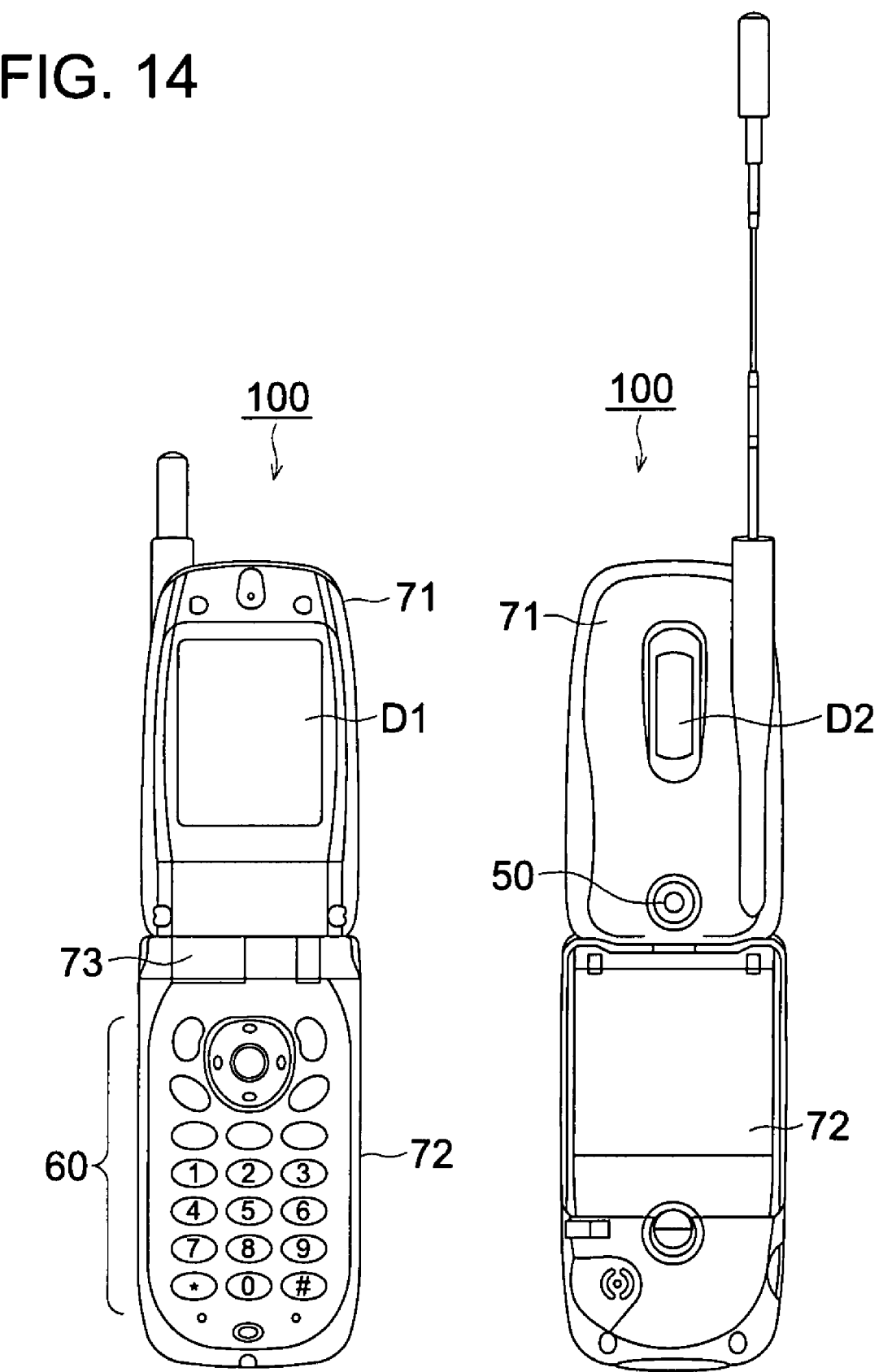
FIG. 14 shown an appearance view of a cell-phone representing an example of a mobile terminal equipped with an image pickup apparatus relating to the present embodiment.

FIG. 14 shows an appearance view of a cell-phone 100 representing an example of a mobile terminal equipped with image pickup apparatus 50 relating to the present embodiment.

In the cell-phone 100 shown in FIG. 14, upper casing 71 representing a case equipped with display screens D1 and D2 and lower casing 72 equipped with operation button 60 which is an input section are connected through hinge 73. The image pickup apparatus 50 is housed under the display screen D2 in the upper casing 71 to be arranged so that the image pickup apparatus 50 may take in light through the outer surface side of the upper casing 71.

Meanwhile, this image pickup apparatus may also be arranged above the display screen D2, or on the side. Further, the cell-phone is not naturally limited to a folding cell-phone.

Figure 15:
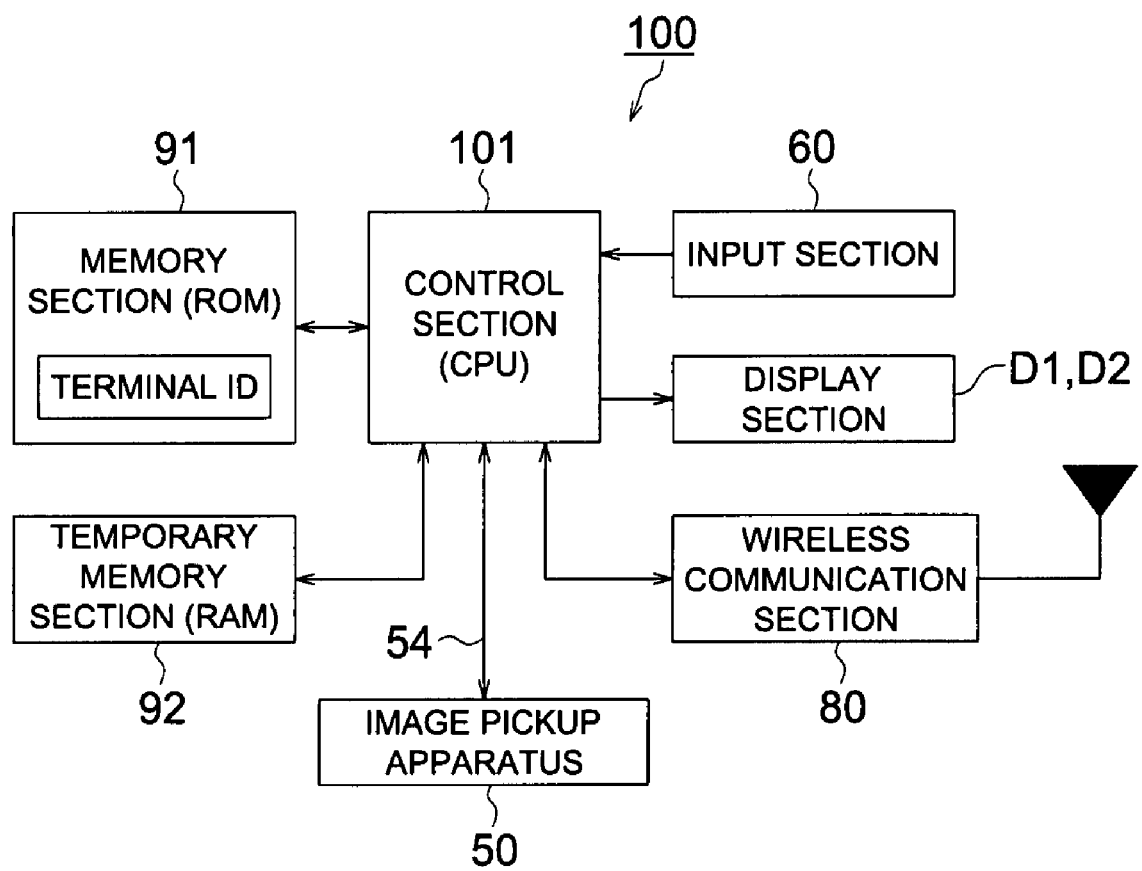
FIG. 15 is a control block diagram of the cell-phone.

FIG. 15 is a control block diagram of cell-phone 100.

As shown in FIG. 15, external connection terminal 54 of the image pickup apparatus 50 is connected with control section 101 of cell-phone 100, and image signals such as luminance signal and color difference signal are outputted to the control section 101.

On the other hand, the cell-phone 100 is equipped with control section (CPU) 101 that carries out a program corresponding to each processing, operation button 60 representing an input section for specifying and inputting the numbers or the like, display screens D1 and D2 which display prescribed data and images picked up, wireless communication section 80 for realizing various types of communication with external servers, memory section (ROM) 91 that stores various necessary data such as a system program of the cell-phone 100, various processing programs and terminal ID, and temporary memory section (RAM) 92 which stores temporarily various processing programs carried out by control section 101 and data, or processing data and image data by the image pickup apparatus 50.

Further, image signals inputted from the image pickup apparatus 50 are stored in the memory section 91 or displayed on display screens D1 and D2 by the control section 101 of the cell-phone 100, and further are transmitted to the outside as image information through the wireless communication section 80.

EXAMPLES

Examples of the image pickup lens relating to the invention will be shown, referring to lens data and aberration diagrams. Each example shows: focal length (f) of the total system of the image pickup lens; back focus (fB), F number (F); diagonal length (2Y) of the image pickup surface of the solid image pickup element; curvature radius (R); surface distance (D) on the optical axis; refractive index (Nd) of the lens material for d line; and Abbe number (vd) of the lens material.

A shape of an aspheric shape in each example is represented by the following Expression (7), with assuming that the origin is the surface vertex of the aspheric surface, X axis extends along the optical axis, and h represents a height in the direction perpendicular to the optical axis.

$$X = \frac{h^2/R}{1+\sqrt{1-(1+K)h^2/R^2}} + \sum A_i h^i \quad (7)$$

Where, $A_i$ represents $i^{th}$ order aspheric surface coefficient, R represents a curvature radius, and K represents a conic constant.

Example 1

The image pickup lens of Example 1 provides the following values: f=4.70 mm, fB=0.40 mm, F=2.88, and 2Y=5.63 mm.

Table 1 shows lens data, and Table 2 shows aspheric surface coefficients.

In the following data such lens data in tables, character E indicates an exponent of a corresponding numerical value. For example, 2.5E-02 means $2.5 \times 10^{-2}$.

TABLE 1

| Surface No. | R (mm) | D (mm) | Nd | νd |
|---|---|---|---|---|
| Aperture stop | ∞ | 0.05 | | |
| 1 | 2.367 | 0.79 | 1.58913 | 61.2 |
| 2 | −7.785 | 0.10 | | |
| 3 | 12.523 | 0.55 | 1.58300 | 30.0 |
| 4 | 1.872 | 0.56 | | |
| 5 | −301.066 | 1.12 | 1.53180 | 56.0 |
| 6 | −1.694 | 0.88 | | |
| 7 | −1.703 | 0.70 | 1.53180 | 56.0 |
| 8 | −2015.070 | 0.30 | | |
| 9 | ∞ | 0.30 | 1.51633 | 64.1 |
| 10 | ∞ | | | |

TABLE 2

| | |
|---|---|
| 1$^{st}$ surface | K = −5.25240E−02 |
| | A4 = −1.48310E−03 |
| | A6 = 5.27380E−03 |
| | A8 = −2.73250E−03 |
| 2$^{nd}$ surface | K = −2.16570E+01 |
| | A4 = 3.58470E−02 |
| | A6 = −1.06910E−02 |
| | A8 = 3.31360E−03 |
| 3$^{rd}$ surface | K = 3.00000E+01 |
| 4$^{th}$ surface | K = −3.08160E−01 |
| | A4 = −3.07030E−02 |
| | A6 = 1.54780E−02 |
| | A8 = −3.43060E−03 |
| 5$^{th}$ surface | K = −3.00000E+01 |
| | A4 = −1.44500E−02 |
| | A6 = 2.54600E−02 |
| | A8 = −4.86620E−03 |
| 6$^{th}$ surface | K = −3.64250E+00 |
| | A4 = −5.31950E−02 |
| | A6 = 2.42660E−02 |
| | A8 = −1.20390E−03 |
| | A10 = 1.32850E−03 |
| | A12 = −4.50340E−04 |
| 7$^{th}$ surface | K = −3.73720E−01 |
| | A4 = 2.23960E−02 |
| | A6 = 1.84140E−02 |
| | A8 = −2.48420E−03 |
| | A10 = −5.81090E−04 |
| | A12 = 1.52620E−04 |
| 8$^{th}$ surface | K = −3.00000E+01 |
| | A4 = −4.37690E−02 |
| | A6 = 1.46060E−02 |
| | A8 = −2.62660E−03 |
| | A10 = 1.91500E−04 |
| | A12 = −4.98160E−06 |

Figure 2:
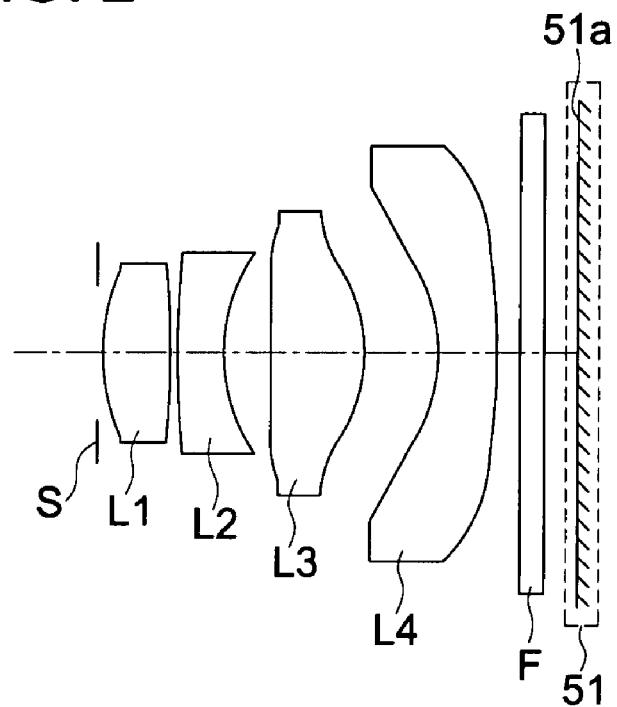
FIG. 2 is a cross-sectional view of the image pickup lens in Example 1.
Figure 3:
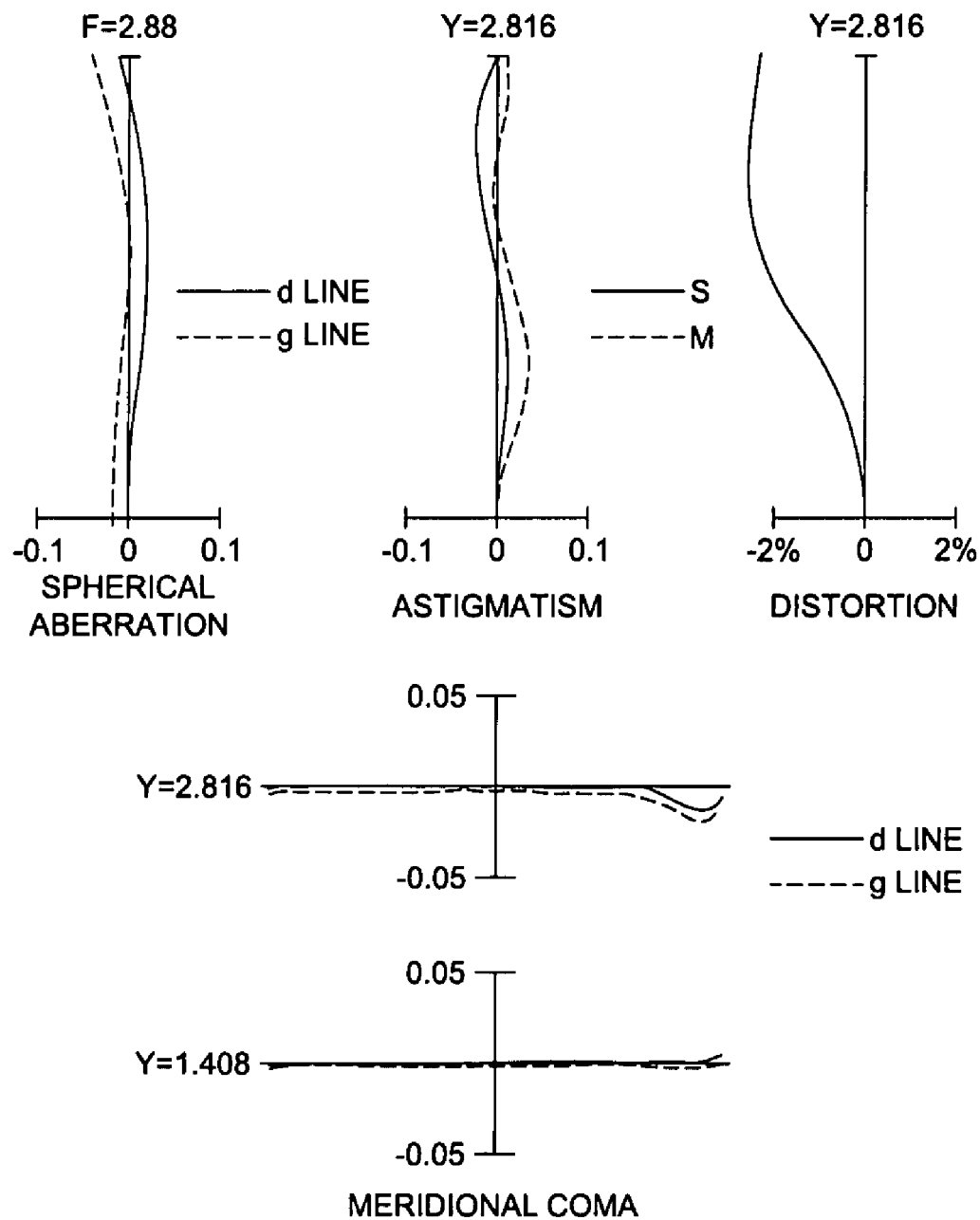
FIG. 3 shows aberration diagrams of the image pickup lens in Example 1.

FIG. 2 is a cross-sectional view of an image pickup lens in Example 1. The lens is provided with an aperture stop S, the first lens L1, the second lens L2, the third lens L3 and the fourth lens L4. Further, the lens is provided with a parallel plate F assuming an optical lowpass filter, IR-cut filter and a seal glass of a solid image pickup element, and a solid image pickup element 51 having photo-electric converter 51a. FIG. 3 shows aberration diagrams (spherical aberration, astigmatism, distortion and meridional coma) in Example 1.

In Example 1, the first lens is a glass mold lens. The second lens is made of polycarbonate-based plastic material, and its saturated water absorption is 0.4%. Each of the third lens and the fourth lens is made of polyolefin-based plastic material, and its saturated water absorption is 0.01% or less.

Since the saturated water absorption of a plastic lens is greater than that of a glass lens, the plastic lens is in a tendency wherein uneven distribution of moisture absorption is caused transiently if humidity is changed suddenly, and a uniform refractive index is lost and excellent image forming performance is not obtained. For restraining deterioration of performance caused by humidity change, it is preferable to use plastic materials all having saturated water absorption of 0.7% or less.

Example 2

The image pickup lens of Example 2 provides the following values: f=3.79 mm, fB=0.40 mm, F=3.29, and 2Y=4.48 mm.

Table 3 shows lens data, and Table 4 shows aspheric surface coefficients.

TABLE 3

| Surface No. | R (mm) | D (mm) | Nd | νd |
|---|---|---|---|---|
| Aperture stop | ∞ | 0.05 | | |
| 1 | 1.816 | 0.78 | 1.53180 | 56.0 |
| 2 | −3.121 | 0.10 | | |
| 3 | −6.808 | 0.50 | 1.58300 | 30.0 |
| 4 | 1.917 | 0.32 | | |
| 5 | 7.068 | 1.17 | 1.53180 | 56.0 |
| 6 | −1.080 | 0.33 | | |
| 7 | −1.058 | 0.55 | 1.53180 | 56.0 |
| 8 | 11.145 | 0.30 | | |
| 9 | ∞ | 0.30 | 1.51633 | 64.1 |
| 10 | ∞ | | | |

TABLE 4

| | |
|---|---|
| 1$^{st}$ surface | K = −2.70450E−01 |
| | A4 = −5.52760E−03 |
| | A6 = −6.24130E−03 |
| | A8 = −1.36520E−02 |
| 2$^{nd}$ surface | K = 2.56480E+00 |
| | A4 = 7.74150E−02 |
| | A6 = −5.81510E−02 |
| | A8 = 6.28330E−03 |
| 3$^{rd}$ surface | K = −2.91630E+01 |
| 4$^{th}$ surface | K = −1.18610E−01 |
| | A4 = −6.14220E−02 |
| | A6 = 7.47400E−02 |
| | A8 = −1.76040E−02 |
| 5$^{th}$ surface | K = 2.62790E+01 |
| | A4 = −6.95580E−02 |
| | A6 = 5.54220E−02 |
| | A8 = −1.53470E−02 |
| 6$^{th}$ surface | K = −2.64050E+00 |
| | A4 = −7.60810E−02 |
| | A6 = 6.18340E−02 |
| | A8 = −1.83060E−02 |
| | A10 = 1.03090E−02 |
| | A12 = −3.42070E−03 |
| 7$^{th}$ surface | K = −6.31860E−01 |
| | A4 = 1.00250E−01 |
| | A6 = 2.38860E−02 |
| | A8 = −8.56440E−03 |
| | A10 = −4.67280E−03 |
| | A12 = 1.67820E−03 |
| 8$^{th}$ surface | K = 6.51650E+00 |
| | A4 = −9.10970E−02 |
| | A6 = 4.29450E−02 |
| | A8 = −1.46030E−02 |
| | A10 = 2.00900E−03 |
| | A12 = −9.58350E−05 |

Figure 4:
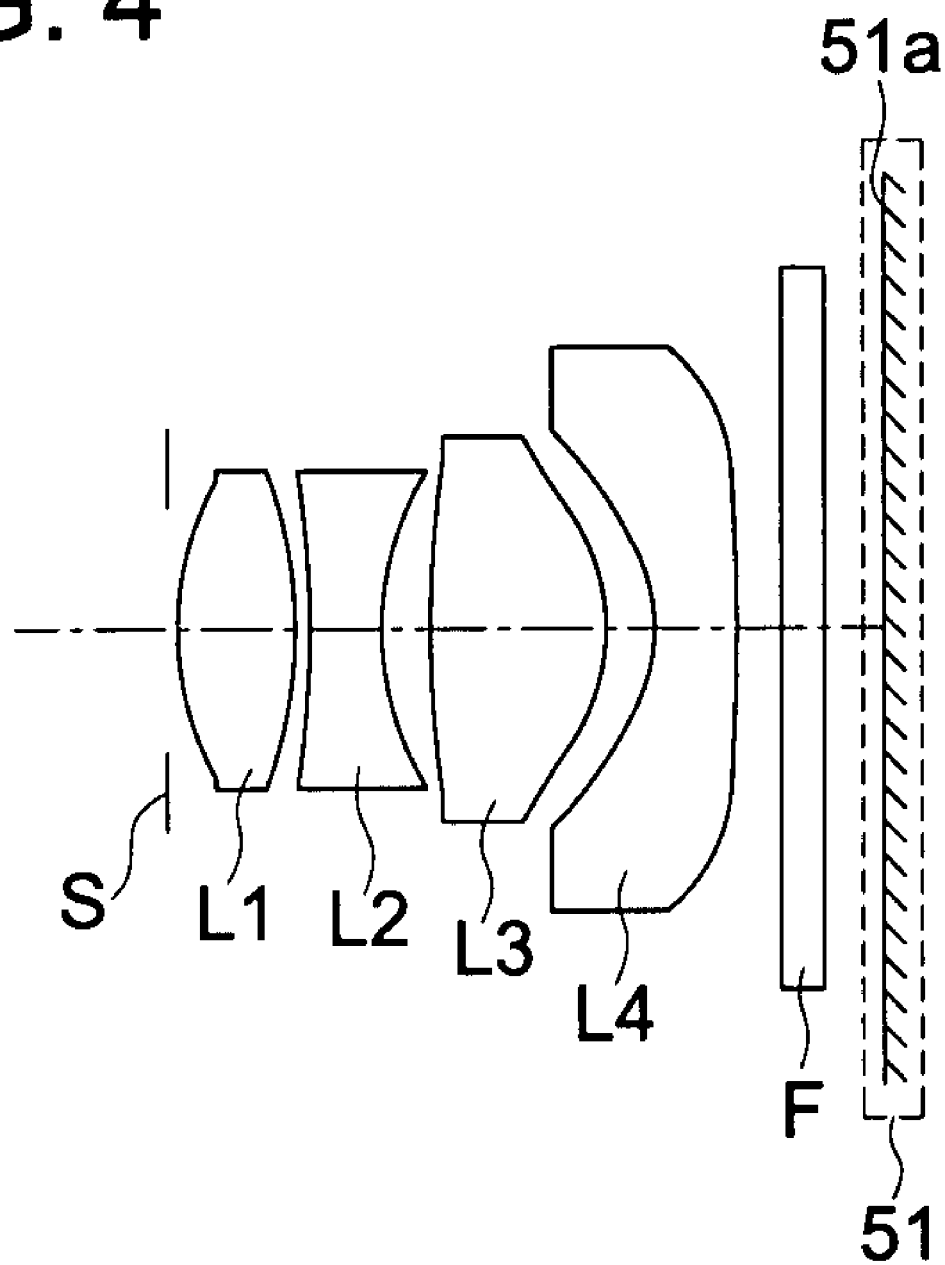
FIG. 4 is a cross-sectional view of the image pickup lens in Example 2.
Figure 5:
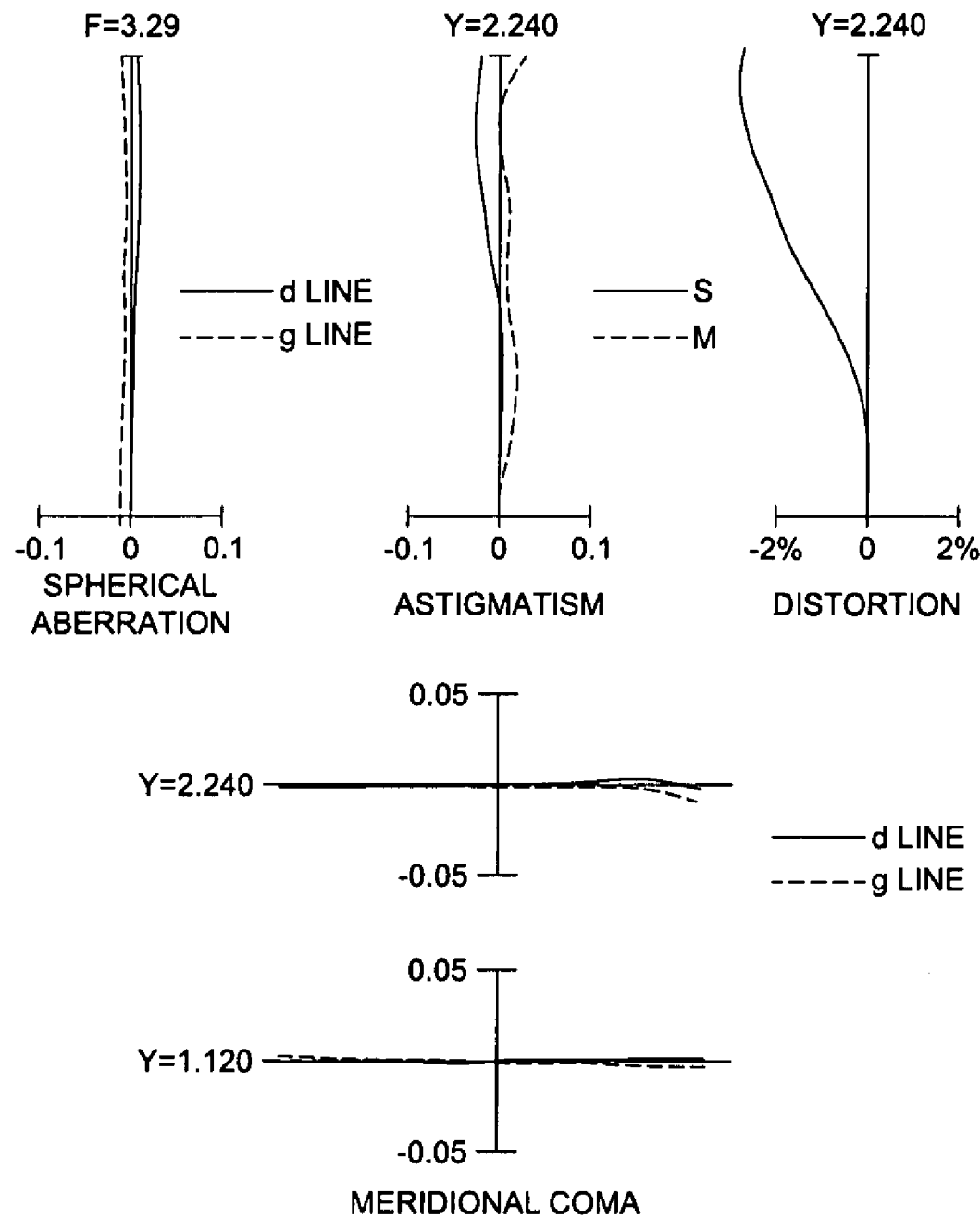
FIG. 5 shows aberration diagrams of the image pickup lens in Example 2.

FIG. 4 is a cross-sectional view of an image pickup lens in Example 2. The lens is provided with: an aperture stop S, the first lens L1, the second lens L2, the third lens L3, and the fourth lens L4. Further, the lens is provided with: a parallel plate F assuming an optical lowpass filter, IR-cut filter and a seal glass of a solid image pickup element, and a solid image pickup element 51 having photo-electric converter 51a. FIG. 5 shows aberration diagrams (spherical aberration, astigmatism, distortion and meridional coma) in Example 2.

In Example 2, each of the first lens, the third lens and the fourth lens is made of polyolefin-based plastic material and its saturated water absorption is 0.01% or less. The second lens is made of polycarbonate-based plastic material, and its saturated water absorption is 0.4%. Since the saturated water absorption of a plastic lens is greater than that of a glass lens, the plastic lens is in a tendency wherein uneven distribution of moisture absorption is caused transiently if humidity is changed suddenly, and a uniform refractive index is lost and excellent image forming performance is not obtained. For restraining deterioration of performance caused by humidity change, it is preferable to use plastic materials all having saturated water absorption of 0.7% or less.

Example 3

The image pickup lens of Example 3 provides the following values: f=4.58 mm, fB=0.96 mm, F=3.29, and 2Y=5.63 mm.

Table 5 shows lens data, and Table 6 shows aspheric surface coefficients.

TABLE 5

| Surface No. | R (mm) | D (mm) | Nd | νd |
|---|---|---|---|---|
| Aperture stop | ∞ | 0.05 | | |
| 1 | 2.300 | 0.76 | 1.53180 | 56.0 |
| 2 | −3.670 | 0.10 | | |
| 3 | −6.357 | 0.50 | 1.58300 | 30.0 |
| 4 | 2.715 | 0.67 | | |
| 5 | −718.769 | 1.16 | 1.58913 | 61.2 |
| 6 | −1.123 | 0.30 | | |
| 7 | −1.604 | 0.70 | 1.53180 | 56.0 |
| 8 | 3.184 | 0.40 | | |
| 9 | ∞ | 0.30 | 1.51633 | 64.1 |
| 10 | ∞ | | | |

TABLE 6

| | |
|---|---|
| 1$^{st}$ surface | K = 1.69280E−01 |
| | A4 = −3.68590E−03 |
| | A6 = −2.82620E−03 |
| | A8 = −7.12610E−03 |
| 2$^{nd}$ surface | K = −2.86080E+00 |
| | A4 = 2.41440E−02 |
| | A6 = −1.69990E−02 |
| | A8 = −1.75740E−02 |
| 3$^{rd}$ surface | K = 3.00000E+01 |
| 4$^{th}$ surface | K = −6.42930E−01 |
| | A4 = −3.28100E−02 |
| | A6 = 1.70690E−02 |
| | A8 = −3.52040E−03 |
| 5$^{th}$ surface | K = −3.00000E+01 |
| | A4 = −2.43390E−02 |
| | A6 = 3.14340E−02 |
| | A8 = −6.13820E−03 |
| 6$^{th}$ surface | K = −2.85620E+00 |
| | A4 = −4.75990E−02 |
| | A6 = 3.31960E−02 |
| | A8 = −2.99330E−03 |
| | A10 = 1.52520E−03 |
| | A12 = −4.00740E−04 |
| 7$^{th}$ surface | K = −6.08520E−01 |
| | A4 = 7.17980E−02 |
| | A6 = −5.91410E−03 |
| | A8 = 2.01180E−03 |
| | A10 = −1.69400E−03 |
| | A12 = 3.37240E−04 |

TABLE 6-continued

| | |
|---|---|
| 8$^{th}$ surface | K = −3.00000E+01 |
| | A4 = −3.55950E−02 |
| | A6 = 1.19370E−02 |
| | A8 = −3.27930E−03 |
| | A10 = 4.16280E−04 |
| | A12 = −2.23770E−05 |

Figure 6:
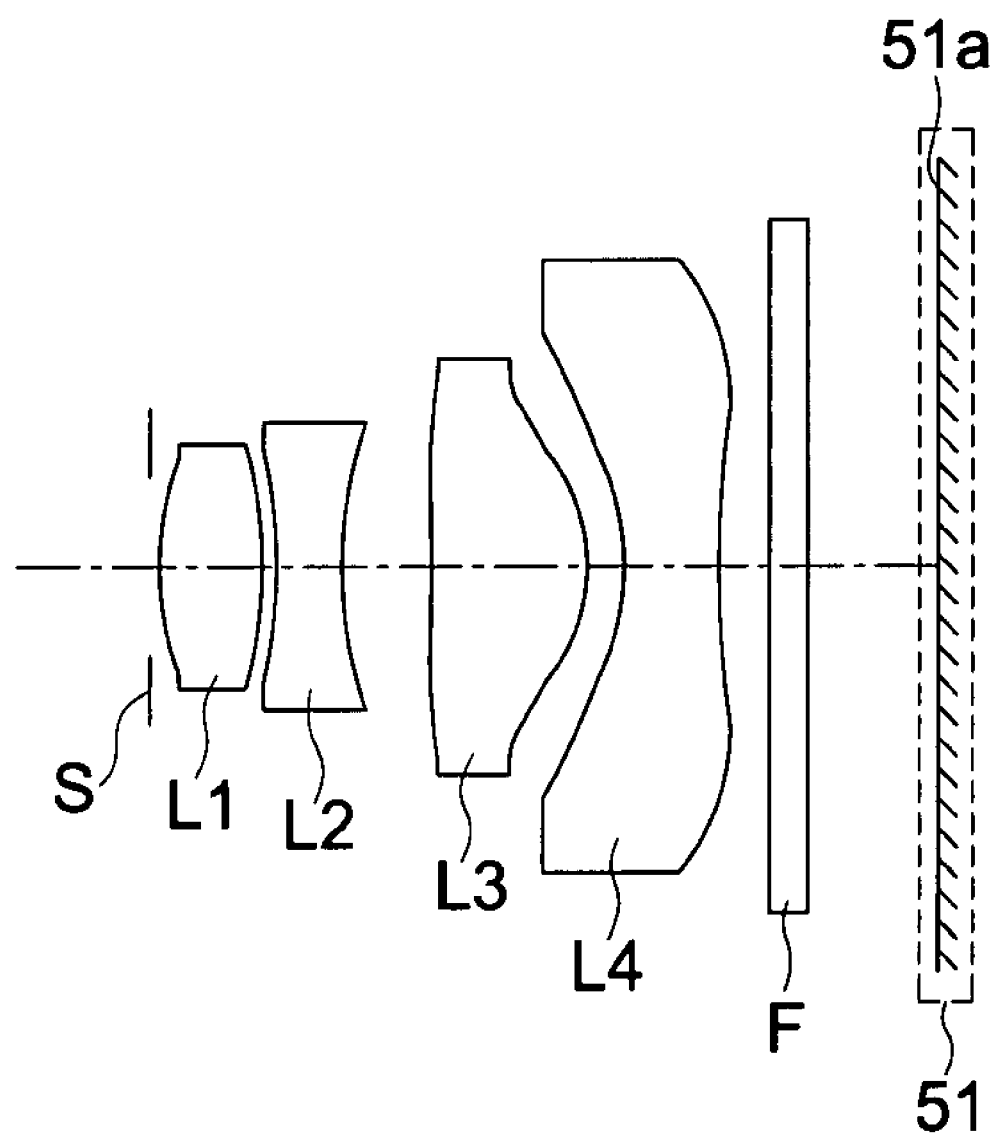
FIG. 6 is a cross-sectional view of the image pickup lens in Example 3.
Figure 7:
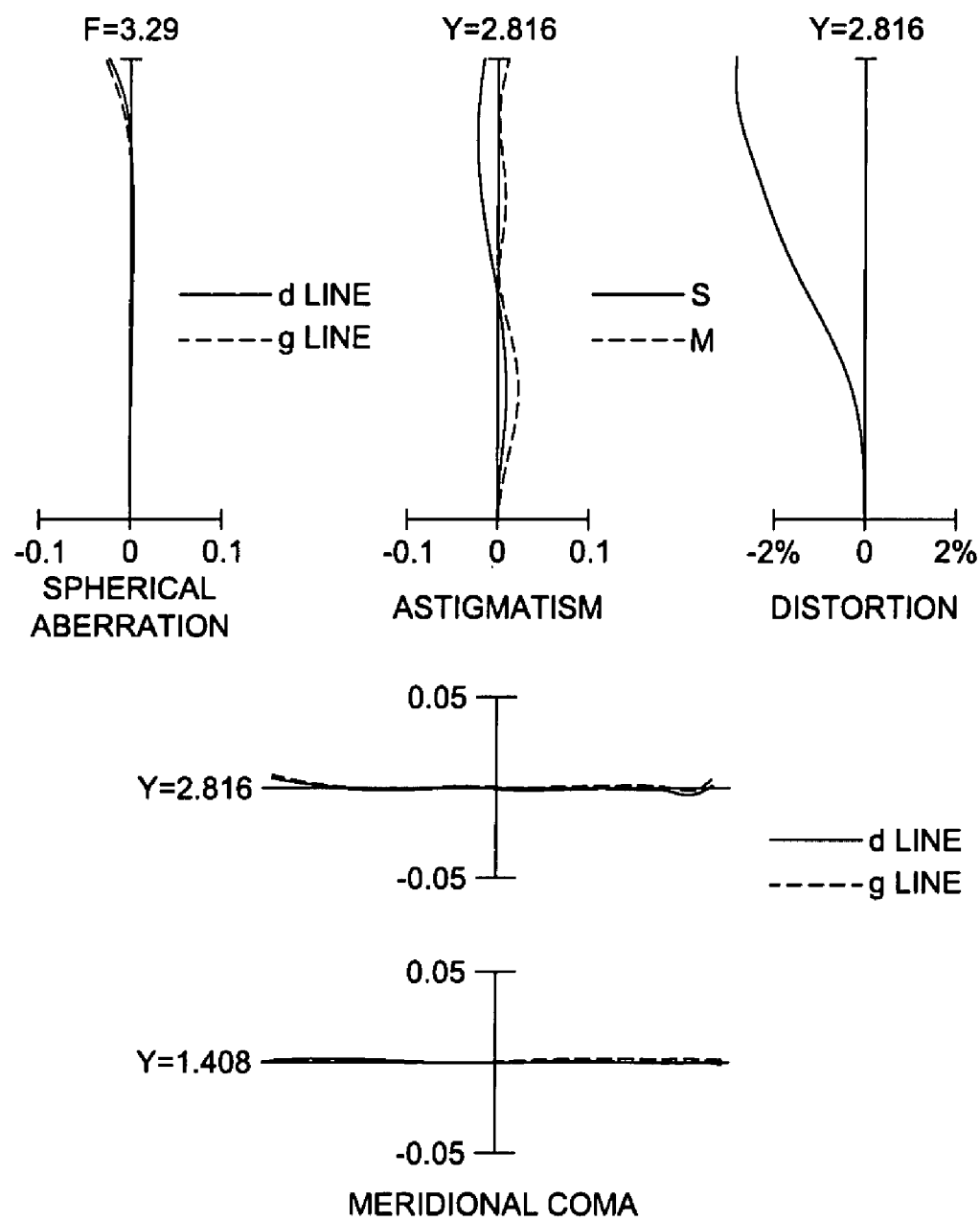
FIG. 7 shows aberration diagrams of the image pickup lens in Example 3.

FIG. 6 is a cross-sectional view of an image pickup lens in Example 3. The lens is provided with an aperture stop S, the first lens L1, the second lens L2, the third lens L3, and the fourth lens L4. Further, the lens is provided with a parallel plate F assuming an optical lowpass filter, IR-cut filter and a seal glass of a solid image pickup element, and a solid image pickup element 51 having photo-electric converter 51a. FIG. 7 shows aberration diagrams (spherical aberration, astigmatism, distortion and meridional coma) in Example 3.

In Example 3, each of the first lens and the fourth lens is made of polyolefin-based plastic material and its saturated water absorption is 0.01% or less. The second lens is made of polycarbonate-based plastic material, and its saturated water absorption is 0.4%. The third lens is a glass mold lens.

Since the saturated water absorption of a plastic lens is greater than that of a glass lens, the plastic lens is in a tendency wherein uneven distribution of moisture absorption is caused transiently if humidity is changed suddenly, and a uniform refractive index is lost and excellent image forming performance is not obtained. For restraining deterioration of performance caused by humidity change, it is preferable to use plastic materials all having saturated water absorption of 0.7% or less.

Example 4

The image pickup lens of Example 4 provides the following values: f=4.73 mm, fB=0.30 mm, F=2.88, and 2Y=5.63 mm.

Table 7 shows lens data, and Table 8 shows aspheric surface coefficients.

TABLE 7

| Surface No. | R (mm) | D (mm) | Nd | νd |
|---|---|---|---|---|
| Aperture stop | ∞ | 0.05 | | |
| 1 | 2.957 | 1.05 | 1.53180 | 56.0 |
| 2 | −2.662 | 0.18 | | |
| 3 | −4.587 | 0.64 | 1.58300 | 30.0 |
| 4 | 2.754 | 0.48 | | |
| 5 | 5.445 | 1.36 | 1.53180 | 56.0 |
| 6 | −1.822 | 0.91 | | |
| 7 | −0.859 | 0.70 | 1.53180 | 56.0 |
| 8 | −2.180 | 0.20 | | |
| 9 | ∞ | 0.30 | 1.51633 | 64.1 |
| 10 | ∞ | | | |

TABLE 8

| | |
|---|---|
| 1$^{st}$ surface | K = −7.57050E−01 |
| | A4 = −1.38070E−02 |
| | A6 = −4.74490E−03 |
| | A8 = −5.89540E−03 |
| 2$^{nd}$ surface | K = −3.27730E−01 |
| | A4 = 2.11740E−02 |
| | A6 = −1.83480E−02 |
| | A8 = −9.27970E−04 |

TABLE 8-continued

| | |
|---|---|
| 3rd surface | K = −9.22970E+00 |
| 4th surface | K = 1.72650E+00 |
| | A4 = −4.85320E−02 |
| | A6 = 2.48160E−02 |
| | A8 = −8.40620E−03 |
| 5th surface | K = −3.79620E+00 |
| | A4 = −3.63150E−02 |
| | A6 = 1.79520E−02 |
| | A8 = −1.67230E−03 |
| 6th surface | K = −3.29520E+00 |
| | A4 = −5.56330E−02 |
| | A6 = 2.27330E−02 |
| | A8 = −3.94440E−03 |
| | A10 = 7.07930E−04 |
| | A12 = 8.51420E−06 |
| 7th surface | K = −8.59430E−01 |
| | A4 = 1.64890E−01 |
| | A6 = −2.14450E−02 |
| | A8 = −5.57430E−04 |
| | A10 = 1.05330E−03 |
| | A12 = −1.69120E−04 |
| 8th surface | K = −6.52930E+00 |
| | A4 = 2.33760E−02 |
| | A6 = −2.38420E−03 |
| | A8 = −1.08950E−03 |
| | A10 = 2.12930E−04 |
| | A12 = −1.33960E−05 |

Figure 8:
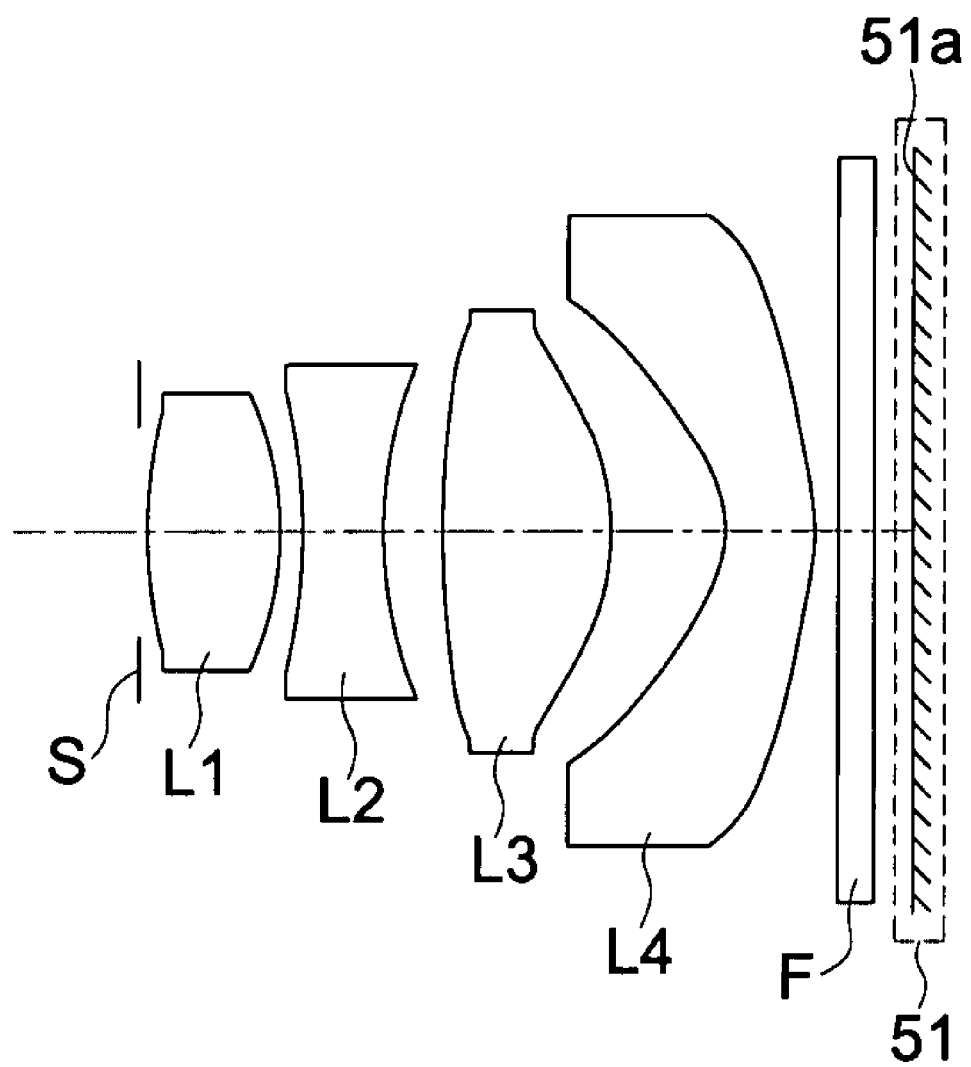
FIG. 8 is a cross-sectional view of the image pickup lens in Example 4.
Figure 9:
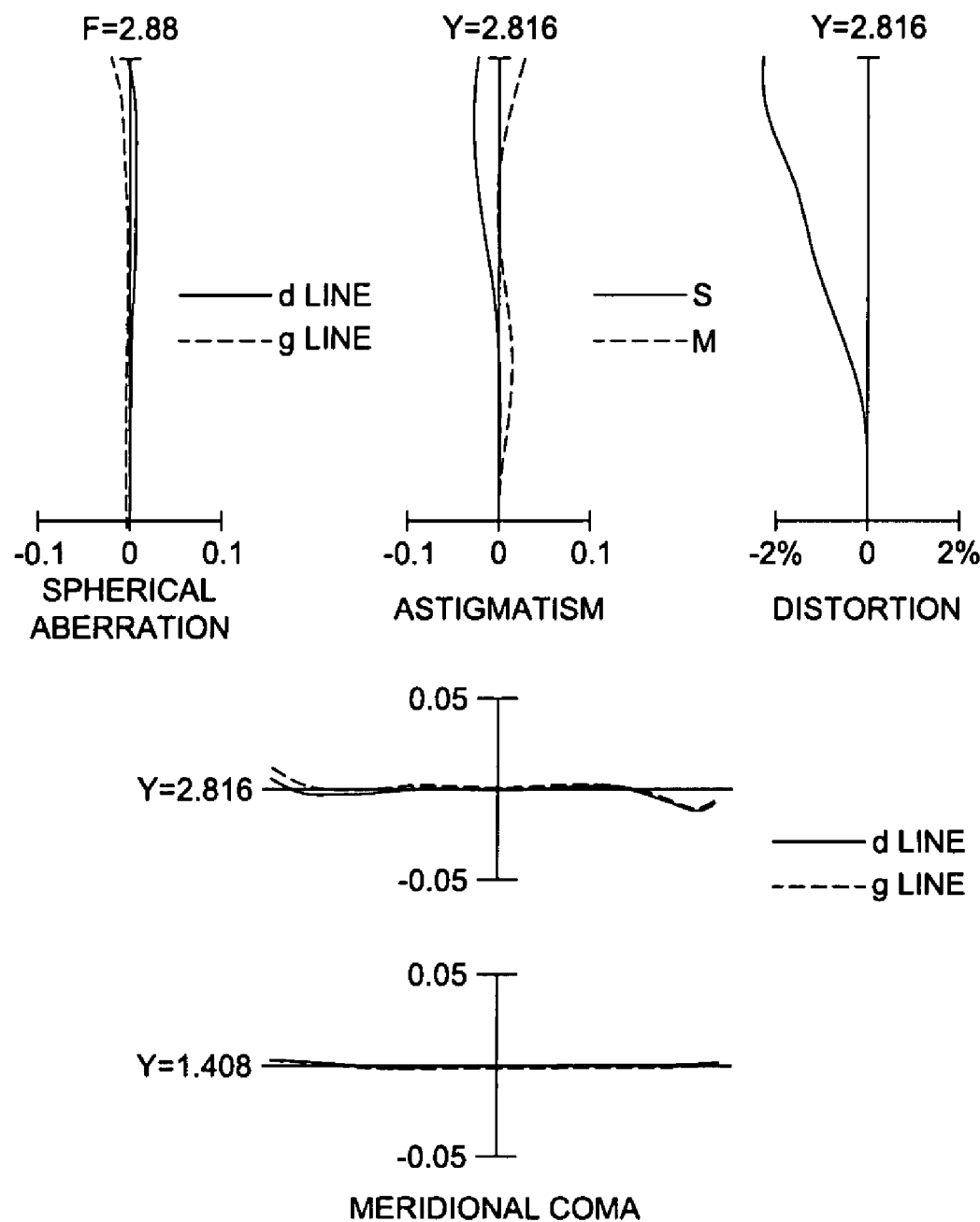
FIG. 9 shows aberration diagrams of the image pickup lens in Example 4.

FIG. 8 is a cross-sectional view of an image pickup lens in Example 4. The lens if provided with an aperture stop S, the first lens L1, the second lens L2, the third lens L3, and the fourth lens L4. Further, the lens is provided with a parallel plate F assuming an optical lowpass filter, IR-cut filter and a seal glass of a solid image pickup element, and a solid image pickup element 51 having photo-electric converter 51a. FIG. 9 shows aberration diagrams (spherical aberration, astigmatism, distortion and meridional coma) in Example 4.

In Example 4, each of the first lens, the third lens and the fourth lens is made of polyolefin-based plastic material and its saturated water absorption is 0.01% or less. The second lens is made of polycarbonate-based plastic material, and its saturated water absorption is 0.4%. Since the saturated water absorption of a plastic lens is greater than that of a glass lens, the plastic lens is in a tendency wherein uneven distribution of moisture absorption is caused transiently if humidity is changed suddenly, and a uniform refractive index is lost and excellent image forming performance is not obtained. For restraining deterioration of performance caused by humidity change, it is preferable to use plastic materials all having saturated water absorption of 0.7% or less.

Example 5

The image pickup lens of Example 5 provides the following values: f=4.68 mm, fB=0.53 mm, F=3.29, and 2Y=5.63 mm.

Table 9 shows lens data, and Table 10 shows aspheric surface coefficients.

TABLE 9

| Surface No. | R (mm) | D (mm) | Nd | νd |
|---|---|---|---|---|
| Aperture stop | ∞ | 0.05 | | |
| 1 | 1.996 | 0.72 | 1.48749 | 70.2 |
| 2 | 14.090 | 0.59 | | |
| 3 | 40.238 | 0.50 | 1.58300 | 30.0 |
| 4 | 3.194 | 0.22 | | |

TABLE 9-continued

| Surface No. | R (mm) | D (mm) | Nd | νd |
|---|---|---|---|---|
| 5 | 8.409 | 1.45 | 1.53180 | 56.0 |
| 6 | −1.274 | 0.45 | | |
| 7 | −1.937 | 0.60 | 1.53180 | 56.0 |
| 8 | 2.899 | 0.50 | | |
| 9 | ∞ | 0.30 | 1.51633 | 64.1 |
| 10 | ∞ | | | |

TABLE 10

| | |
|---|---|
| 1st surface | K = 3.61350E−01 |
| | A4 = 1.05150E−02 |
| | A6 = 1.13690E−02 |
| | A8 = −2.16200E−03 |
| 2nd surface | K = 1.20190E+01 |
| | A4 = 4.82480E−02 |
| | A6 = 9.76960E−03 |
| | A8 = 1.39810E−02 |
| 3rd surface | K = −3.00000E+01 |
| 4th surface | K = −7.54250E−01 |
| | A4 = 2.80370E−03 |
| | A6 = 2.21960E−03 |
| | A8 = −8.56370E−04 |
| 5th surface | K = 1.55210E+01 |
| | A4 = −2.23850E−02 |
| | A6 = 2.04320E−02 |
| | A8 = −2.64620E−03 |
| 6th surface | K = −2.90890E+00 |
| | A4 = −5.37960E−02 |
| | A6 = 2.16720E−02 |
| | A8 = −4.65110E−03 |
| | A10 = 2.11130E−03 |
| | A12 = −5.52980E−05 |
| 7th surface | K = −3.61960E−01 |
| | A4 = −5.86330E−03 |
| | A6 = 6.59360E−03 |
| | A8 = 3.93120E−03 |
| | A10 = −1.75410E−03 |
| | A12 = 2.45580E−04 |
| 8th surface | K = −1.72860E+01 |
| | A4 = −4.79890E−02 |
| | A6 = 1.28590E−02 |
| | A8 = −2.80360E−03 |
| | A10 = 3.36200E−04 |
| | A12 = −1.81660E−05 |

Figure 10:
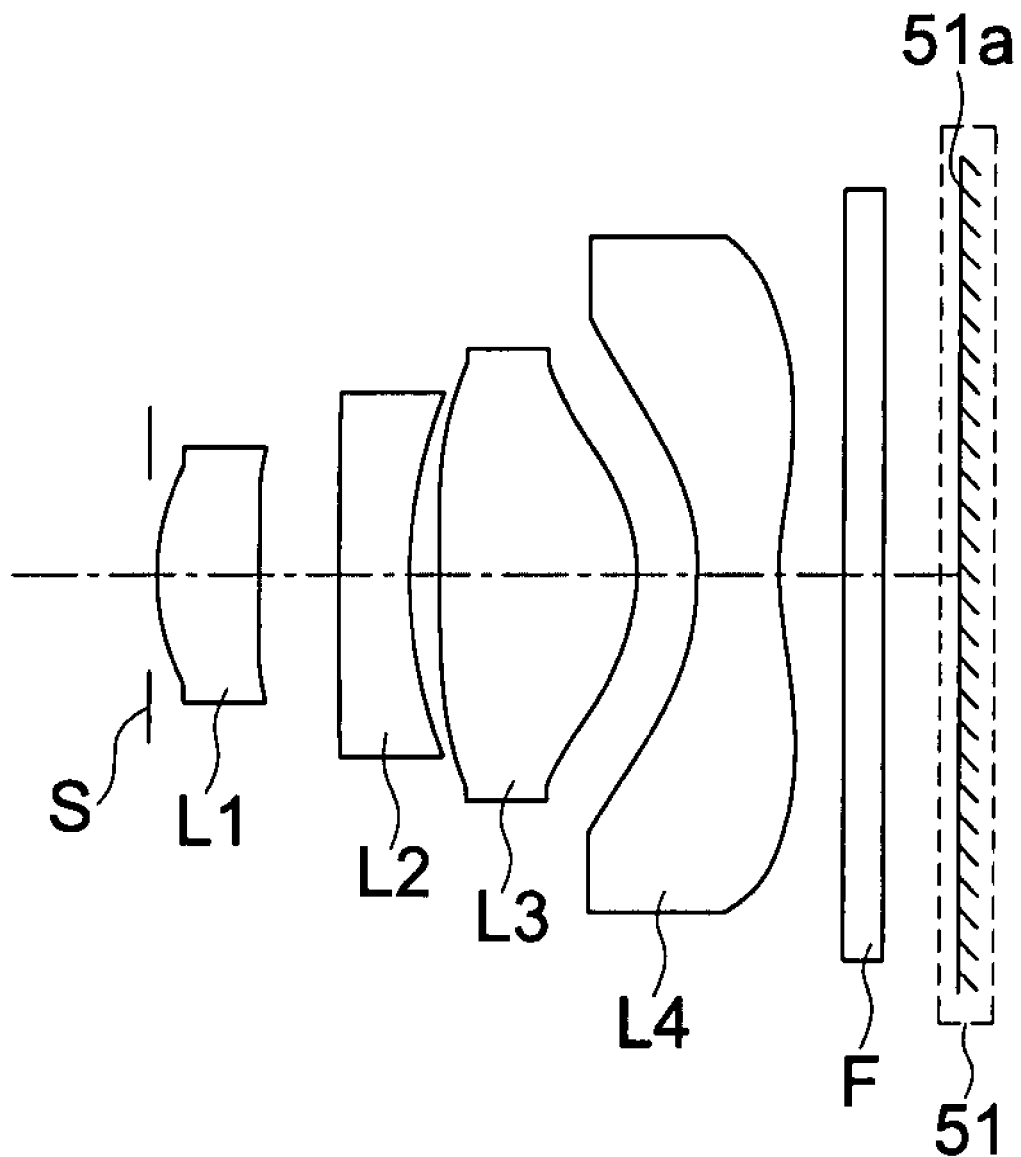
FIG. 10 is a cross-sectional view of the image pickup lens in Example 5.
Figure 11:
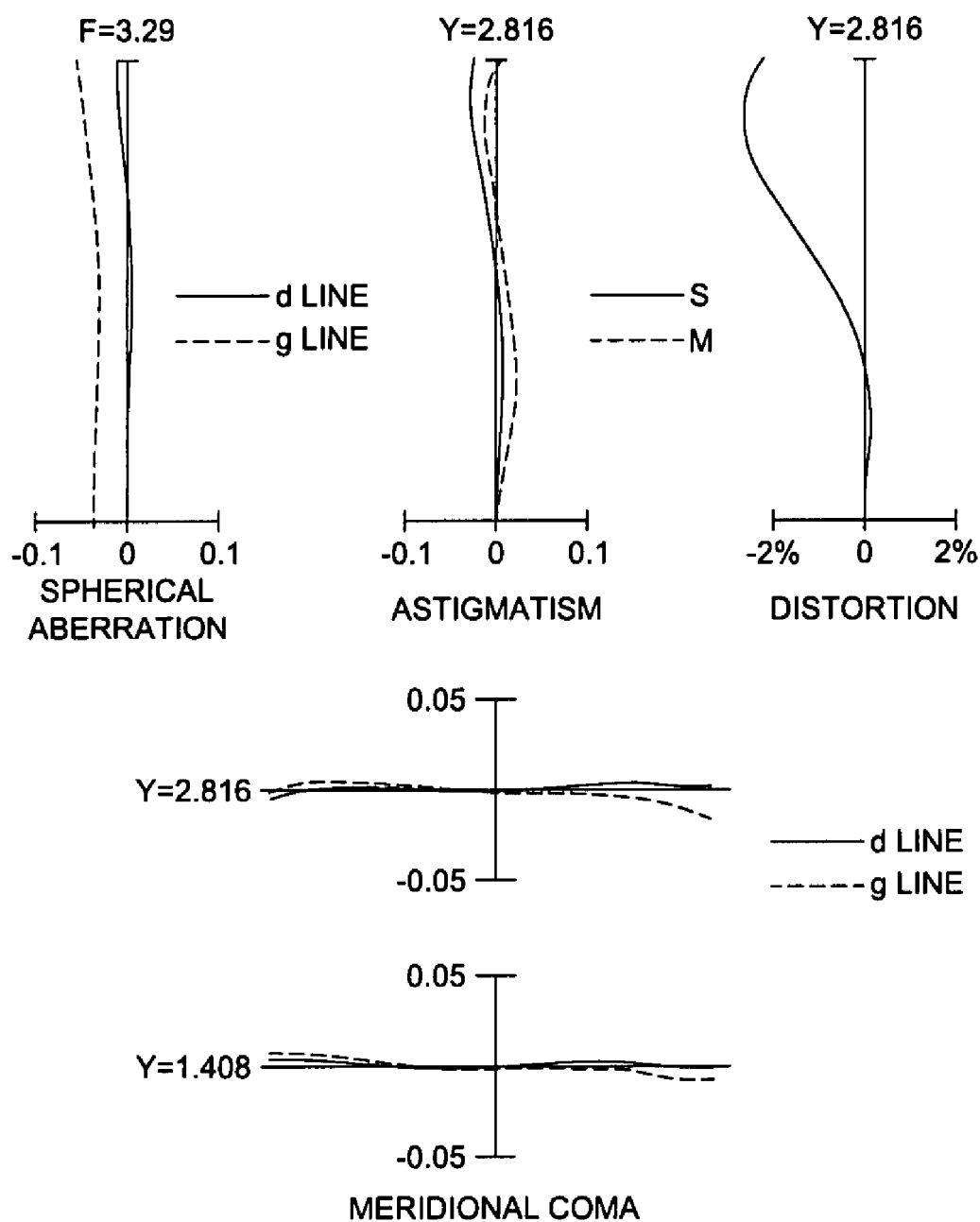
FIG. 11 shows aberration diagrams of the image pickup lens in Example 5.

FIG. 10 is a cross-sectional view of an image pickup lens in Example 5. The lens is provided with an aperture stop S, the first lens L1, the second lens L2, the third lens L3, and the fourth lens L4. Further, the lens is provided with a parallel plate F assuming an optical lowpass filter, IR-cut filter and a seal glass of a solid image pickup element, and a solid image pickup element 51 having photo-electric converter 51a. FIG. 11 shows aberration diagrams (spherical aberration, astigmatism, distortion and meridional coma) in Example 5.

In Example 5, the first lens is a glass mold lens. The second lens is made of polycarbonate-based plastic material, and its saturated water absorption is 0.4%. Each of the third lens and the fourth lens is made of polyolefin-based plastic material and its saturated water absorption is 0.01% or less.

Since the saturated water absorption of a plastic lens is greater than that of a glass lens, the plastic lens is in a tendency wherein uneven distribution of moisture absorption is caused transiently if humidity is changed suddenly, and a uniform refractive index is lost and excellent image forming performance is not obtained. For restraining deterioration of performance caused by humidity change, it is preferable to use plastic materials all having saturated water absorption of 0.7% or less.

Values of respective Examples corresponding to the aforesaid conditional expressions (1)-(6) are shown collectively in Table 11. Further, an image pickup apparatus equipped with the image pickup lens of each of the examples has a height along the optical axis of 10 mm or lower.

TABLE 11

|  | Example 1 | Example 2 | Example 3 | Example 4 | Example 5 |
|---|---|---|---|---|---|
| (1) f1/f | 0.68 | 0.60 | 0.61 | 0.60 | 1.00 |
| (2) (r7 + r8)/(r7 − r8) | −1.00 | −0.83 | −0.33 | −2.30 | −0.20 |
| (3) d34/f | 0.19 | 0.09 | 0.07 | 0.19 | 0.10 |
| (4) r4/f | 0.40 | 0.51 | 0.59 | 0.58 | 0.68 |
| (5) ν1 − ν2 | 31.2 | 26.0 | 26.0 | 26.0 | 40.2 |
| (6) L/f | 1.24 | 1.28 | 1.30 | 1.31 | 1.27 |

Since a plastic lens has a great change in refractive index caused by temperature changes, it may have a problem that an image point position of the total image pickup lens system is fluctuated when ambient temperatures are changed in the image pickup lens in which whole of the first through fourth lenses are formed of plastic lens as the Examples 2 and 4. In such image pickup apparatus, the change in image point position cannot be ignorable. Under the aforesaid background, it is possible to reduce the problem, as shown in the Examples 1 and 5, by making the first lens L1 having positive refractive power to be a lens formed with glass material (for example, a glass mold lens), by making the second lens L2, third lens L3 and fourth lens L4 to be a plastic lens and by creating refractive power allocation so as to cancel image point position fluctuations in the case of temperature changes for the second lens L2, the third lens L3 and the fourth lens L4. The same effect as in the foregoing can be obtained even in the occasion where the third lens L3 having positive refractive power is made of glass material, and other lenses are made to be plastic lenses, as shown in Example 3. Incidentally, when using a glass mold lens, it is preferable to use glass material having glass transition point (Tg) of 400° C. or less, for preventing molding dies from consumption as much as possible.

In recent study, it has been found that refractive index change due to the temperature change of plastic material can be controlled to small by dispersing inorganic microparticles into the plastic material.

In the detailed explanation, when inorganic microparticles are mixed in general transparent plastic material, light scattering is caused and transmittance is lowered. Thereby, the above plastic material has been difficult to be used as an optical material. However, the scattering can be prevented substantially, by reducing a size of the microparticles to be smaller than a wavelength of a transmitting light flux. A plastic material has a decreased refractive index, when the temperature rises, but an inorganic microparticle has an increased refractive index when the temperature rises. It is therefore possible that a refractive index may hardly be changed, by utilizing the aforesaid temperature-dependencies of the plastic material and the inorganic microparticles to cancel them out each other. Specifically, a plastic material with a refractive index having an extremely low temperature-dependency is obtained, by dispersing inorganic microparticles with the maximum diameter of 20 nanometers or less into a plastic material representing a base material. For example, it is possible to reduce a change of a refractive index caused by temperature changes, by dispersing microparticles of niobium oxide ($Nb_2O_5$) into acrylic resin. In Examples, when one of two positive lens (L1 and L3) or each of the lenses (L1 to L4) of the image pickup lens relating to the present invention uses such a plastic lens in which inorganic microparticles are dispersed, fluctuation of the image point position caused with temperature change of the total image pickup lens system can be controlled in small.

The refractive index change due to temperature will be described in detail. When A represents a change of a refractive index caused by temperature changes, the change of a refractive index caused by temperature changes A is represented by Expression (8) by differentiating refractive index n with temperature t based on Lorentz-Lorenz's formula:

$$A = \frac{(n^2 + 2)(n^2 - 1)}{6n}\left\{(-3\alpha) + \frac{1}{[R]}\frac{\partial[R]}{\partial t}\right\} \quad (8)$$

Where, α represents the coefficient of linear expansion and [R] represents molecular refraction. In the case of plastic material, contribution of the second term in Expression (8) is small in general, compared with the first term of Expression (8), and it is substantially negligible. For example, in the case of PMMA resin, coefficient of linear expansion α is $7 \times 10^{-5}$, and when it is substituted in the aforesaid expression, $A = -1.2 \times 10^{-4}$/° C. holds, which almost agrees with an actual measurement.

Specifically, it is preferable to control change of a refractive index caused by temperature changes A which has been about $-1.2 \times 10^{-4}$/° C. to be less than $8 \times 10^{-5}$/° C. in terms of an absolute value. It is preferable to control it to be less than $6 \times 10^{-5}$/° C. in terms of an absolute value.

Table 12 shows changes of a refractive index caused by temperature changes A (=dn/dT) of plastic materials which can be applied in embodiments relating to the invention.

TABLE 12

| Plastic materials | A (approximate value) [$10^{-5}$/° C.] |
|---|---|
| Polyolefin-based plastic material | −11 |
| Polycarbonate-based plastic material | −14 |

Now, there will be provided a difference of an amount of changes of the back focus, between an example employing a plastic lens in which inorganic microparticles are dispersed, and an example not employing a plastic lens in which inorganic microparticles are dispersed, with using the image pickup lens in Example 2.

First, in the example which does not employ the plastic lens of Example 2 in which inorganic microparticles are dispersed, an amount of changes of the back focus in an occasion where a temperature raises by +30° C. from a normal temperature (20° C.) is +0.019 mm, while, an amount of changes of the back focus in an occasion where a temperature is lowered by 30° C. from the normal temperature is −0.019 mm.

Next, Table 13 shows changes of refractive index and caused by temperature change in an example employing a plastic material in which inorganic microparticles are dispersed for the first lens L1 and the third lens L3 and employing a plastic material containing no inorganic microparticles for the second lens L2 and the fourth lens L4.

TABLE 13

| | A [/° C.] | Refractive index at normal temperature | Refractive index at normal temperature plus 30° C. | Refractive index at normal temperature minus 30° C. |
|---|---|---|---|---|
| First lens | $-8 \times 10^{-5}$ | 1.5318 | 1.5294 | 1.5342 |
| | $-6 \times 10^{-5}$ | | 1.5300 | 1.5336 |
| Second lens | $-14 \times 10^{-5}$ | 1.5830 | 1.5788 | 1.5872 |
| Third lens | $-8 \times 10^{-5}$ | 1.5318 | 1.5294 | 1.5342 |
| | $-6 \times 10^{-5}$ | | 1.5300 | 1.5336 |
| Fourth lens | $-11 \times 10^{-5}$ | 1.5318 | 1.5285 | 1.5351 |

According to Table 13, amounts of changes of the back focus (ΔfB) caused when the temperature is raised by +30° C. from a normal temperature (20° C.) are +0.006 mm and −0.003 mm in an example that each of the first lens L1 and the third lens L3 shows $A=-8\times10^{-5}/°$ C. and an example that each of the first lens L1 and the third lens L3 shows $A=-6\times10^{-5}/°$ C., respectively. While, amounts of changes of the back focus caused when the temperature is lowered by 30° C. from the normal temperature are −0.006 mm and +0.003 mm in an example that each of the first lens L1 and the third lens L3 shows $A=-8\times10^{-5}/°$ C. and an example that each of the first lens L1 and the third lens L3 shows $A=-6\times10^{-5}/°$ C., respectively.

Compared with the example which uses the plastic lens containing no inorganic microparticles at all, in the example that employs the plastic material in which inorganic grains are dispersed for the first lens L1 and the third lens L3 and the material provides $A=-6\times10^{-5}/°$ C., an amount ΔfB of changes of the back focus caused by temperature changes is controlled to be extremely small, which is shown by Table 13.

Further, each of the first lens L1 to the fourth lens L4 may also use plastic material in which inorganic microparticles are dispersed and the microparticles have a different value of refractive index change A caused by temperature change. In that case, it is also possible that a fluctuation in the image point position of the total image pickup lens caused by temperature change is not generated at all, by selecting an optimum value of A with considering magnifications of contributions from respective lenses for the fluctuation in the image point position caused by temperature change.

Further, in Example 3, the third lens L3 having positive refractive power is a glass mold lens, the first lens L1 having positive refractive power, the second lens L2 having negative refractive power and the fourth lens L4 having negative refractive power are plastic lenses, and refractive powers are allocated to the first lens L1, the second lens L2 and the fourth lens L4 so as to cancel the fluctuation in the image point position caused by temperature changes each other to a certain extent. Thereby, an amount of changes of back focus caused by temperature changes is made to be extremely small. In Example 3, an amount of changes of the back focus caused when a temperature is raised by +30° C. from a normal temperature (20° C.) and an amount of changes of the back focus caused when a temperature is lowered by 30° C. from a normal temperature are −0.000 mm and +0.000 mm, respectively.

Incidentally, with respect to the incidence angle of the principal ray of a light flux entering an image pickup surface of a solid image pickup element in the present examples, it is not always designed to be sufficiently small on the peripheral part of the image pickup surface. However, in the recent technology, it has become possible to lighten the shading by reviewing arrangement of color filters of solid image pickup element and on-chip micro-lens array. Specifically, if a pitch of the arrangement of color filters and on-chip micro-lens array is set to be slightly small for a pixel pitch of the image pickup surface of the image pickup element, a light flux entering obliquely can be guided effectively to the light-receiving portion of each pixel, because a color filter and on-chip micro-lens array are shifted toward the optical axis of the image pickup lens for each pixel, as a position of light approaches a peripheral part of the image pickup surface. Owing to this, the shading caused on the solid-state image pickup element can be controlled to be small. The present examples show examples designed with aiming to miniaturization of the image pickup lens more excellent because the above requirement about the to the principal ray incidence angle is lightened.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image pickup lens for forming a subject image on a photo-electric converter of a solid image pickup element, the image pickup lens comprising, in order from an object side thereof:

an aperture stop;
   a first lens having a positive refractive power;
   a second lens having a negative refractive power;
   a third lens having a positive refractive power; and
   a fourth lens having a negative refractive power whose surface facing the object side is a concave surface, the fourth lens comprising at least one optical surface in an aspheric shape,
   wherein the image pickup lens satisfies $0.40 < f1/f < 1.30$, and $-3.0 < (r7+r8)/(r7-r8) < 0$, where
   f1 is a focal length of the first lens,
   f is a focal length of a total system of the image pickup lens,
   r7 is a curvature radius of the surface facing the object side on the fourth lens, and
   r8 is a curvature radius of the surface facing an image side on the fourth lens.

2. The image pickup lens of claim 1 satisfying a following expression:

$0.05 < d34/f < 0.25$, where
   d34 is a distance along an optical axis of an air space between the third lens and the fourth lens, and
   f is a focal length of a total system of the image pickup lens.

3. The image pickup lens of claim 1 satisfying a following expression:

$0.30 < r4/f < 0.80$, where
   r4 is a curvature radius of the surface facing the image side on the second lens, and
   f is a focal length of the image pickup lens.

4. The image pickup lens of claim 1,
   wherein a surface facing the image side on the second lens is an aspherical surface such that a farther position on the aspherical surface from an optical axis has a smaller negative refractive power.

5. The image pickup lens of claim 1,
wherein the surface facing the object side on the fourth lens is an aspherical surface such that a farther position on the aspherical surface from an optical axis has a smaller negative refractive power.

6. The image pickup lens of claim 1, satisfying $$20 < v1 - v2 < 65,$$

where
v1 is an Abbe number of the first lens, and
v2 is an Abbe number of the second lens.

7. The image pickup lens of claim 1,
wherein one of the first lens and the third lens comprises a glass and the other comprises a plastic.

8. The image pickup lens of claim 1,
wherein each of the first through fourth lenses comprises a plastic.

9. An image pickup apparatus comprising:
a solid image pickup element;
a substrate supporting the solid image pickup element;
a connecting terminal formed on the substrate for transmitting and receiving electrical signal;
a casing comprising a shielding material, and comprising an aperture where a light flux from an object side enters into; and
the image pickup lens of claim 1 housed in the casing, for receiving a light flux passing through the aperture and forming the light flux onto the solid image pickup element;
wherein the casing, the image pickup lens, and the substrate are integrally formed as one body, and
the image pickup apparatus has a height of 10 mm or less along the optical axis.

10. A mobile terminal comprising the image pickup apparatus of claim 9.

* * * * *